United States Patent
Mochizuki et al.

(10) Patent No.: US 10,235,426 B2
(45) Date of Patent: Mar. 19, 2019

(54) PROPOSING A COPY AREA IN A DOCUMENT

(71) Applicant: International Business Machines Corporation, Armonk, NY (US)

(72) Inventors: Tomoka Mochizuki, Tokyo (JP); Munehiko Sato, Tokyo (JP); Tomonori Sugiura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 15/196,238

(22) Filed: Jun. 29, 2016

(65) Prior Publication Data

US 2018/0004750 A1 Jan. 4, 2018

(51) Int. Cl.
*G06F 7/00* (2006.01)
*G06F 17/30* (2006.01)
*G06F 17/21* (2006.01)

(52) U.S. Cl.
CPC ........ *G06F 17/3053* (2013.01); *G06F 17/218* (2013.01); *G06F 17/30011* (2013.01)

(58) Field of Classification Search
CPC .............. G06F 17/3053; G06F 17/218; G06F 17/30011
USPC ........................................................ 707/751
See application file for complete search history.

(56) References Cited

U.S. PATENT DOCUMENTS

| | | |
|---|---|---|
| 7,877,685 B2 | 1/2011 | Peters |
| 2005/0114833 A1* | 5/2005 | Bates ........................ G06F 8/33 717/110 |
| 2008/0263023 A1* | 10/2008 | Vailaya ............. G06F 17/30675 |
| 2009/0125848 A1 | 5/2009 | Keohane et al. |
| 2010/0228718 A1* | 9/2010 | Chen ................. G06F 17/30864 707/709 |
| 2012/0102401 A1 | 4/2012 | Ijas et al. |
| 2013/0212081 A1* | 8/2013 | Shenoy ............. G06F 17/30657 707/706 |
| 2013/0275889 A1 | 10/2013 | O'Brien-Strain et al. |
| 2015/0169530 A1* | 6/2015 | Otero .................... G06F 17/246 715/219 |
| 2015/0193395 A1 | 7/2015 | Nicolaou et al. |

(Continued)

FOREIGN PATENT DOCUMENTS

| | | |
|---|---|---|
| JP | 2006268638 A | 10/2006 |
| JP | 2014099052 A | 5/2014 |

OTHER PUBLICATIONS

Mochizuki et al., "Proposing a Copy Area in a Document", U.S. Appl. No. 15/875,152, filed Jan. 19, 2018.

(Continued)

*Primary Examiner* — Van Oberly
(74) *Attorney, Agent, or Firm* — Scott S. Dobson

(57) ABSTRACT

Information on a cursor or pointer position is obtained, indicating a first content on a document displayed on a screen. A plurality of second contents are retrieved from a history information, each of the second contents comprising the first content. The history information comprises sets of contents, each of the sets comprising a content in the document which was copied by one or more users, and position information of this content. The sets are ranked in a predetermined order. A copy area is proposed based on one or more second contents in the predetermined order among the retrieved second contents.

17 Claims, 19 Drawing Sheets

(56) References Cited

U.S. PATENT DOCUMENTS

2016/0117072 A1\* 4/2016 Sharifi ................ G06F 3/04842
 715/769
2018/0004755 A1 1/2018 Mochizuki et al.

OTHER PUBLICATIONS

Mochizuki et al., "Proposing a Copy Area in a Document", U.S. Appl. No. 15/875,165, filed Jan. 19, 2018.
Accelerated Examination Support Document, International Business Machines Corporation, dated Jan. 10, 2018, 17 pages.
Accelerated Examination Support Document, International Business Machines Corporation, dated Jan. 10, 2018, 16 pages.
List of IBM Patents or Patent Applications Treated as Related, dated Jan. 17, 2018, pp. 1-2.
"Accelerated Examination Support Document", International Business Machines Corporation, dated Jul. 24, 2017, 14 pages.
Mochizuki et al., "Proposing a Copy Area in a Document", U.S. Appl. No. 15/665,469, filed Aug. 1, 2017.
List of IBM Patents or Patent Applications Treated as Related, dated Jul. 26, 2017, pp. 1-2.

\* cited by examiner

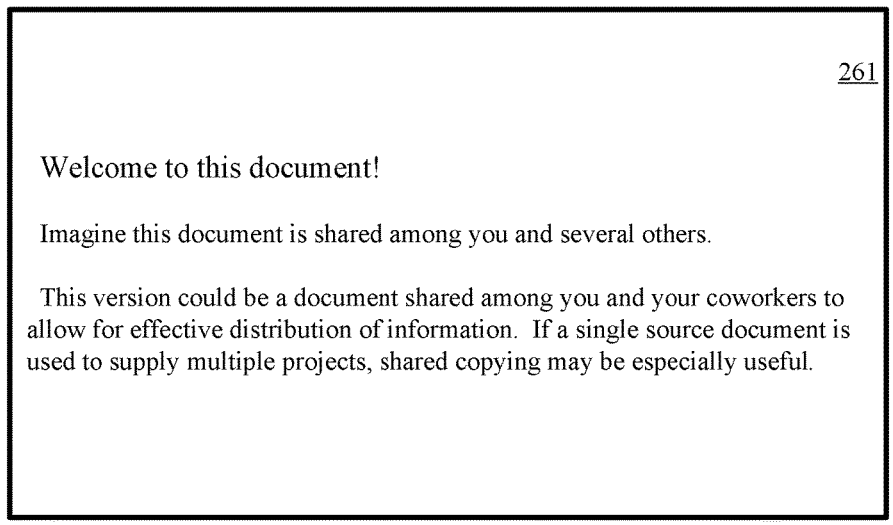
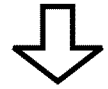
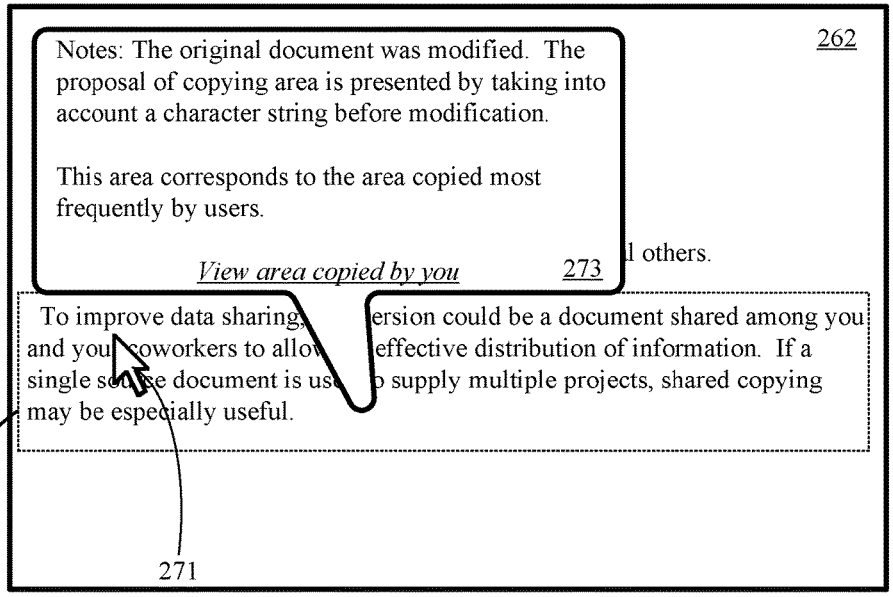
Fig. 2C

Fig. 7A

| Date of copying | Information on a copy source document | Copied content | The number of copies made | Score | Position of the copied content | Content comprising the copied content |
|---|---|---|---|---|---|---|
| 6/22/2015 | URL 1 | This version | 3 | 3 | (T2;1st byte; 9th bytes) | This version could be a document shared among you and your coworkers to allow for effective distribution of information. If a single source document is used to supply multiple projects, shared copying may be especially useful. |
| 6/23/2015 | URL 1 | This version could be a document shared among you and your coworkers to allow for effective distribution of information. If a single source document is used to supply multiple projects, shared copying may be especially useful. | 1 | 1 | (T2;1st byte; 181st bytes) | This version could be a document shared among you and your coworkers to allow for effective distribution of information. If a single source document is used to supply multiple projects, shared copying may be especially useful. |
| 6/11/2014 | Test/Notes Development:Notes DB | email address 1 | 18 | 17.1 | (10th byte; 39th byte) | |
| 6/23/2015 | Test/Notes Development:Notes DB | email address 1 | 10 | 10 | (10th byte; 39th byte) | |
| 6/23/2015 | Test/Notes Development:Notes DB | ABC1 | 1 | 1 | (55th byte; 58th byte) | |

| Date of copying | Information on a copy source document | Copied content | The number of copies made | Score | Position of the copied content | Content comprising the copied content |
|---|---|---|---|---|---|---|
| 12/1/2013 | URL 1 | This version | 8 | 7.6 | (72;1st byte,980 byte) | This version could be a document shared among you and your coworkers to allow for effective distribution of information. If a single source document is used to supply multiple projects, shared copying may be especially useful. |
| 6/23/2015 | URL 1 | This version | 2 | 2 | (72;1st byte, 581 byte) | This version could be a document shared among you and your coworkers to allow for effective distribution of information. If a single source document is used to supply multiple projects, shared copying may be especially useful. |
| 6/23/2015 | URL 1 | This version | 17 | 17 | (72;1st byte, 981 byte) | This version could be a document shared among you and your coworkers to allow for effective distribution of information. If a single source document is used to supply multiple projects, shared copying may be especially useful. |
| 6/23/2015 | URL 1 | This version could be a document shared among you and your coworkers to allow | 4 | 4 | (72;501 byte, 770 byte) | This version could be a document shared among you and your coworkers to allow for effective distribution of information. If a single source document is used to supply multiple projects, shared copying may be especially useful. |
| 11/15/2013 | URL 1 | This version could be a document shared among you and your coworkers to allow for effective distribution of information. If a single source document is used to supply multiple projects, shared copying may be especially useful. | 5 | 4.5 | (72;1st byte, 181 byte) | This version could be a document shared among you and your coworkers to allow for effective distribution of information. If a single source document is used to supply multiple projects, shared copying may be especially useful. |
| 6/23/2015 | URL 1 | This version could be a document shared among you and your coworkers to allow for effective distribution of information. If a single source document is used to supply multiple projects, shared copying may be especially useful. | 5 | 4.75 | (72;1st byte, 181 byte) | This version could be a document shared among you and your coworkers to allow for effective distribution of information. If a single source document is used to supply multiple projects, shared copying may be especially useful. |
| 6/23/2015 | URL 1 | This version could be a document shared among you and your coworkers to allow for effective distribution of information. If a single source document is used to supply multiple projects, shared copying may be especially useful. | 3 | 3 | (72;1st byte, 181 byte) | This version could be a document shared among you and your coworkers to allow for effective distribution of information. If a single source document is used to supply multiple projects, shared copying may be especially useful. |
| 8/21/2012 | TestFolders\Development\Notes.DB | email address 1 | 20 | 12 | (100th byte, 350th byte) | |
| 6/4/2013 | TestFolders\Development\Notes.DB | email address 1 | 13 | 11.2 | (100th byte, 350th byte) | |
| 8/11/2014 | TestFolders\Development\Notes.DB | email address 1 | 18 | 17.3 | (100th byte, 350th byte) | |
| 6/23/2015 | TestFolders\Development\Notes.DB | email address 1 | 12 | 12 | (100th byte, 350th byte) | |
| 6/23/2015 | TestFolders\Development\Notes.DB | Password | 1 | 1 | (1st byte, 55th byte) | |

| Information on a copy source document | Group | Copied content | Total Score | Rank | Position of the copied content | Content comprising the copied content |
|---|---|---|---|---|---|---|
| URL 1 | | This version | 26.6 | 1 | (T2; 1st byte; 8th byte) | This version could be a document shared among you and your coworkers to allow for effective distribution of information. If a single source document is used to supply multiple projects, shared copying may be especially useful. |
| URL 1 | URL 1 (110th byte; 214th byte) | This version could be a document shared among you and your coworkers to allow | 4 | 3 | (T2;5th byte; 84th byte) | This version could be a document shared among you and your coworkers to allow for effective distribution of information. If a single source document is used to supply multiple projects, shared copying may be especially useful. |
| URL 1 | | This version could be a document shared among you and your coworkers to allow for effective distribution of information. If a single source document is used to supply multiple projects, shared copying may be especially useful. | 13.25 | 2 | (T2; 1st byte; 161st byte) | This version could be a document shared among you and your coworkers to allow for effective distribution of information. If a single source document is used to supply multiple projects, shared copying may be especially useful. |
| Test/Notes Development:Notes:DB | Test/Notes Development:Notes: DB*(110th byte; 42nd byte) | email address 1 | 57.8 | 1 | (10th byte; 39th byte) | |
| Test/Notes Development:Notes:DB | Test/Notes Development:Notes: DB*(48th byte; 53rd byte) | Password | 1 | 1 | (1st byte; 8th byte) | |

| Date of copying | Information on a copy source document | Copied contents | The number of copies made | Position of the copied contents | Content comprising the copied content |
|---|---|---|---|---|---|
| 6/22/2015 | URL_1 | This version | 2 | (T2:1st byte; 8th bytes) | This version could be a document shared among you and your coworkers to allow for effective distribution of information. If a single source document is used to supply multiple projects, shared copying may be especially useful. |
| 6/23/2015 | URL_1 | This version could be a document shared among you and your coworkers to allow for effective distribution of information. If a single source document is used to supply multiple projects, shared copying may be especially useful. | 1 | (T2:1st byte; 181st bytes) | This version could be a document shared among you and your coworkers to allow for effective distribution of information. If a single source document is used to supply multiple projects, shared copying may be especially useful. |
| 6/23/2015 | URL_1 | Welcome to this doc! | 18 | (2nd byte; 27th byte) | Welcome to this doc! |

⇩

741

| Date of copying | Information on a copy source document | Copied contents | The number of copies made | Position of the copied contents | Content comprising the copied content |
|---|---|---|---|---|---|
| 6/22/2015 | URL_1 | This version | 3 | (T2:22nd byte; 30th bytes) | To improve data sharing, this version could be a document shared among you and your coworkers to allow for effective distribution of information. If a single source document is used to supply multiple projects, shared copying may be especially useful. |
| 6/23/2015 | URL_1 | This version could be a document shared among you and your coworkers to allow for effective distribution of information. If a single source document is used to supply multiple projects, shared copying may be especially useful. | 1 | (T2:22nd byte; 202nd bytes) | To improve data sharing, this version could be a document shared among you and your coworkers to allow for effective distribution of information. If a single source document is used to supply multiple projects, shared copying may be especially useful. |
| 6/23/2015 | URL_1 | (deleted) | (deleted) | (2nd byte; 28th bytes) | Welcome to this doc! |

Fig. 7E

| Information on a copy source document | Document where the copied content is pasted | Security information | Place where the history information is available |
|---|---|---|---|
| Document in a user device | Document in a user device | History information is not shared with a server | History information is only locally available |
| Document in a user device | Document on a server | History information is not shared with a server | History information is only locally available |
| Document on a server | Document in a user device | History information is shared with a server | History information is locally available and also uploaded on a serever |
| Document on a server | Document on a server | History information is shared with a server | History information is locally available and also uploaded on a serever |

PROPOSING A COPY AREA IN A DOCUMENT

BACKGROUND

The present disclosure relates to a text editing interface and more specifically, to proposing a copy area in a document.

Many computing devices provide a basic copying function wherein a portion of text, a graphic, a format, etc. may be "lifted" from a particular page or window and replicated to another. This is generally accomplished by selecting the desired portion of text, graphic, file, etc. using a mouse cursor or other pointer to indicate each a "start copying" and "stop copying" point. By selecting the copy function, the text, graphic, etc. indicated by the mouse selection is moved to a "clipboard." The clipboard a function provided by most operating systems, which is used to hold copied content until the user indicates it should be replicated.

SUMMARY

According to one aspect of an embodiment of the present disclosure, the present disclosure provides a computer-implemented method for proposing a copy area in a document.

Information on a cursor or pointer position is obtained, indicating a first content on a document displayed on a screen. A plurality of second contents are retrieved from a history information, each of the second contents comprising the first content. The history information comprises sets of contents, each of the sets comprising a content in the document which was copied by one or more users, and position information of this content. The sets are ranked in a predetermined order. A copy area is proposed based on one or more second contents in the predetermined order among the retrieved second contents.

According to another aspect of an embodiment of the present disclosure, a computer system comprising a computer readable storage medium storing a program of instructions executable by the computer system to perform one or more methods described herein also may be provided.

According to another aspect of an embodiment of the present disclosure, a computer program product comprising a computer readable storage medium storing a program of instructions executable by the computer system to perform one or more methods described herein also may be provided.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIGS. 2A through 2C illustrate an embodiment of a screen for proposing a copy area in a document to a user on a display.

FIG. 7A illustrates an embodiment of a history information for a user device.

FIG. 7B illustrates an embodiment of a history information for a server.

FIG. 7C illustrates an embodiment of a history information for a server after grouping.

FIG. 7D illustrates an embodiment of a history information for a user device or a server after a modification of a copy source document was made.

FIG. 7E illustrates an embodiment of an availability information on a document.

Figure 1:
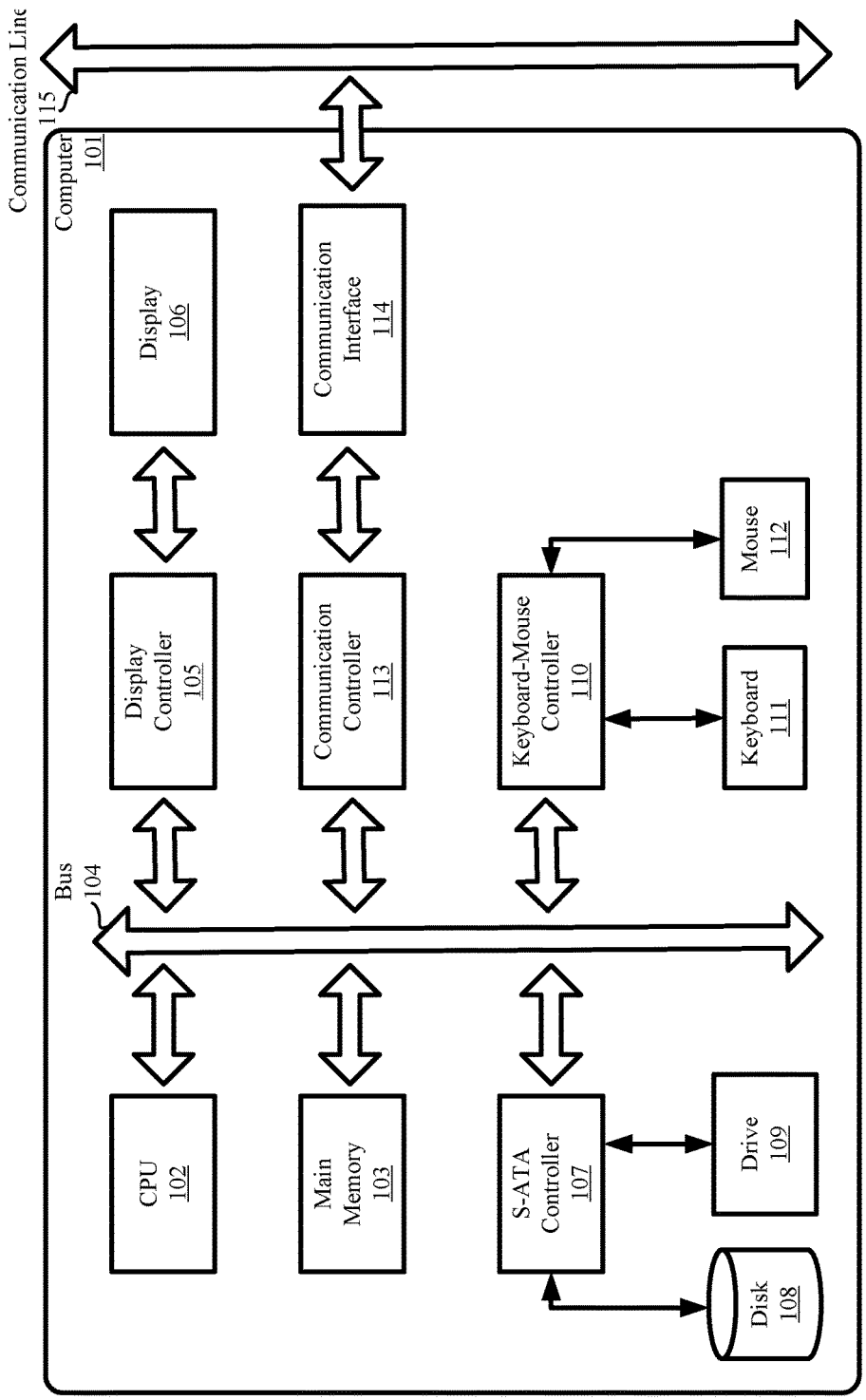
FIG. 1 illustrates an exemplified basic block diagram of a computer hardware used in an embodiment of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

When a user attempts to copy a text string in a document, such as a document on a website or in a local document, it may be cumbersome to specify an appropriate area of a text displayed on a screen of a device. When a user uses a device having a small screen, such as a smartphone, mobile phone or tablet, there may be some difficulty in specifying, using a finger or pointing device, a copy area, for example one character for starting or ending point where the user wants to copy.

With reference now to FIG. 1, FIG. 1 illustrates an exemplified basic block diagram of a computer hardware used in an embodiment of the present disclosure.

A computer 101 may be, for example, but is not limited to, a desktop, laptop, notebook or server computer. The server computer may be, for example, but is not limited to, a workstation, a rack-mount type server, a blade type server, or a mainframe server and may run, for example, a hypervisor for creating and running one or more virtual machines. The computer 101 may comprise one or more CPUs 102 and a main memory 103 connected to a bus 104.

A display 106 such as a liquid crystal display LCD may be connected to the bus 104 via a display controller 105. The display 106 may be used to display, for management of the computer(s), information on a computer connected to a network via a communication line and information on software running on the computer using an appropriate graphics interface. The display may have a touch screen or a non-touch screen. The display may be for example, but not limited to, a LCD, PDP, OEL or a projection type display. A disk 108 such as a hard disk or a solid state drive, SSD, and a drive 109 such as a CD, a DVD, or a BD Blu-ray disk drive may be connected to the bus 104 via an SATA or IDE controller 107. Moreover, a keyboard 111 and a mouse 112 may be connected to the bus 104 via a keyboard-mouse controller 110 or USB bus not shown.

An operating system, programs, and any data may be stored in the disk 108 to be loadable to the main memory. The drive 109 may be used to install a program, such as the computer program of an embodiment of the present disclosure, readable from a CD-ROM, a DVD-ROM, or a BD to the disk 108 or to load any data readable from a CD-ROM, a DVD-ROM, or a BD into the main memory 103 or the disk 108, if necessary.

A communication interface 114 may be based on, for example, but is not limited to, the Ethernet protocol. The communication interface 114 may be connected to the bus 104 via a communication controller 113, physically connects the computer 101 to a communication line 115, and may provide a network interface layer to the TCP/IP communication protocol of a communication function of the operating system of the computer 101. In this case, the communication line 115 may be a wired LAN environment or a wireless LAN environment based on wireless LAN connectivity standards.

Hereinafter, a user device and optionally a server may be used in an embodiment of the present disclosure. The user device may be a computer, such as described in FIG. 1, a smart phone, a mobile phone, a tablet, a book reader, a virtual machine, etc. The server may be a computer, such as described in FIG. 1 and connected to one or more user devices via an internet or intranet connection.

Figure 2A:
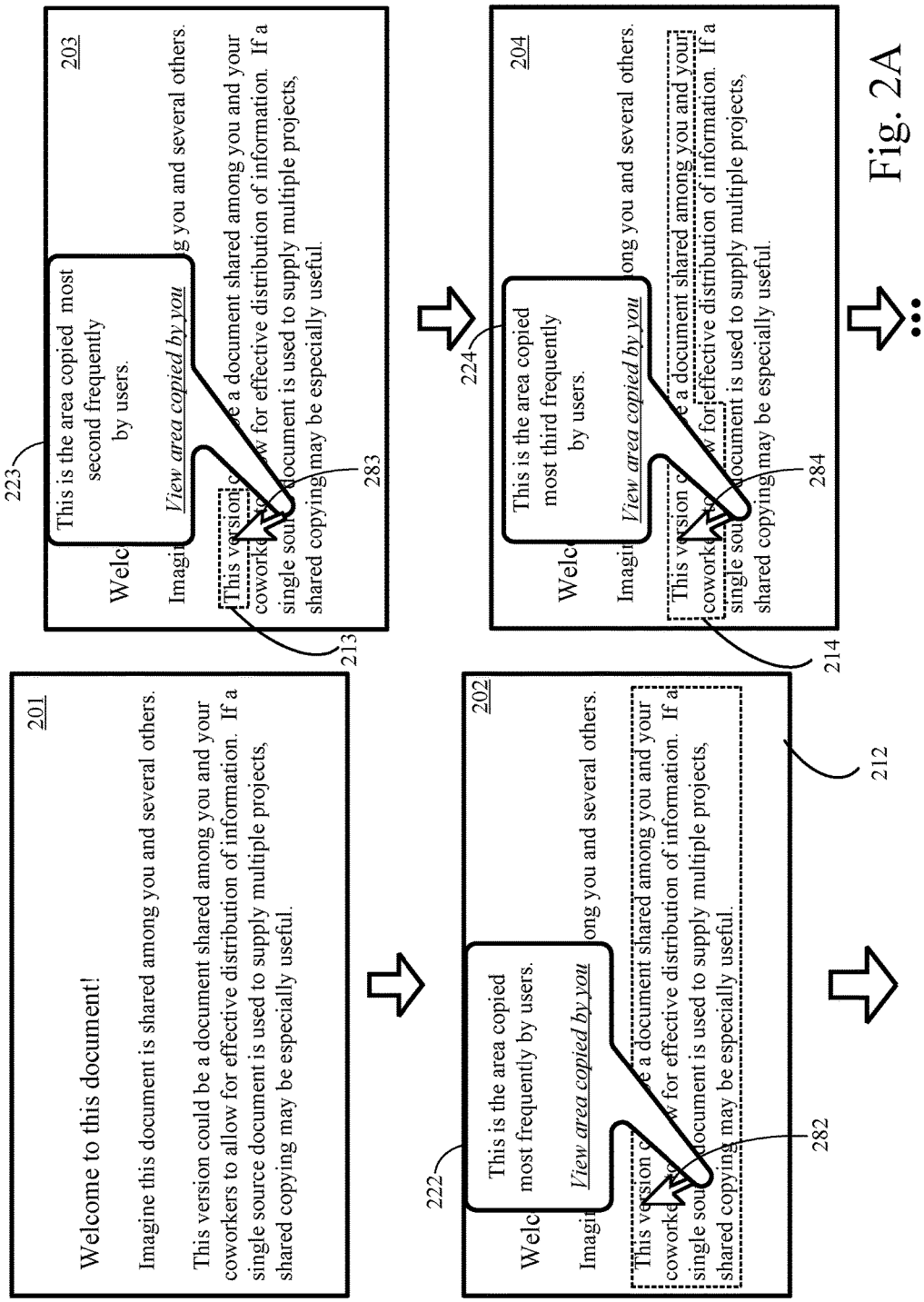
Figure 2B:
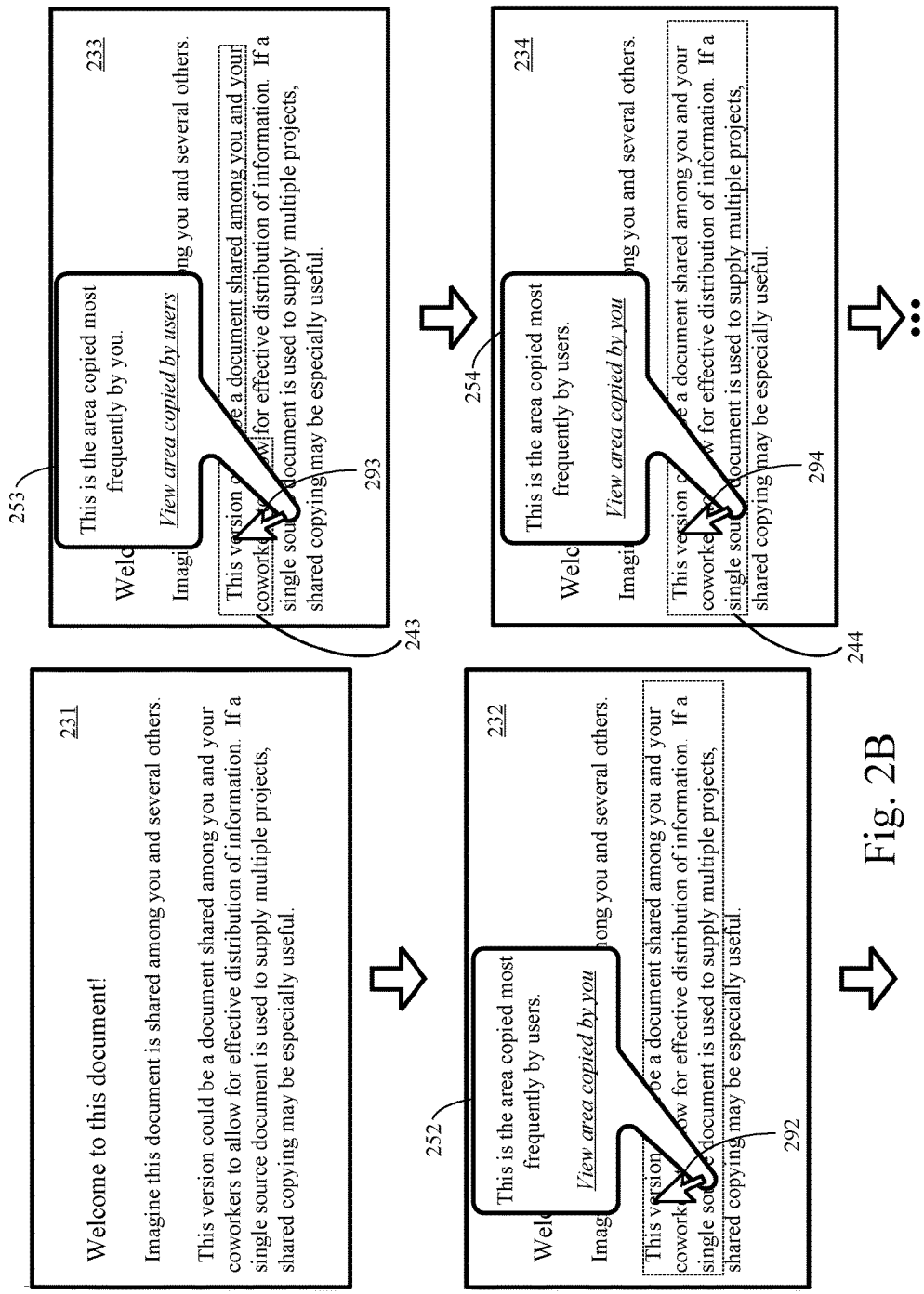

FIGS. 2A and 2B illustrate an embodiment of a screen for proposing a copy area in a document to a user on a display With reference to FIG. 2A, FIG. 2A illustrates an embodiment of a screen of a user device.

The user device displays a part of a document on the screen 201 of the user device. The document has one or more contents which can be copyable. The document may be, for example, a local or server document in any format. The document may be, for example, but not limited to, a structured document in which tags are used, such as a web page document, an unstructured document, or a word, spreadsheet, presentation or PDF document. The tags may be, for example, HTML or XML. A content may be, for example, but not limited to one or more character strings, one or more cells in a spreadsheet, one or more photo image, one or more moving image, a combination of these, etc.

If the user wants to copy content, such as a character string, in the document, the user may make a predetermined operation, such as one left click by a mouse cursor 282 or one touch by a finger, in the vicinity of an area where the user wants to copy.

In response to a detection of the one touch or click, the user device obtains information on a cursor or pointer position on the document. The touch may comprise, for example, tap operation. The cursor pointer position may be, for example, a mouse pointer position. The pointer position may be, for example, a touch position by a finger or touch pen, or a laser pointer position.

If the position is a character string in the document, such as "er" in the sentence, "This version", the user device may obtain a plurality of contents comprising such character string. The plurality of contents may be retrieved from a history information which may include sets of contents in the document and their position information. Each of the sets may include content in the document and position information of this content. The content may have been previously copied by one or more users. The sets may be ranked in a predetermined order. History information may be in a form of, for example, but not limited to, a database, a text file, such as a CSV format, or a structured text, such as XML based text.

The user device obtains, as a copy area, one or more contents among the plurality of contents comprising the character string. The obtained one or more contents may be ranked in a predetermined order. The predetermined order may be determined in descending order according to a score or rank which is associated with each of the one or more contents.

In response to a detection of the predetermined operation, the content, "This version could be a document shared among you and your coworkers to allow for effective distribution of information. If a single source document is used to supply multiple projects, shared copying may be especially useful," 212, is highlighted on the screen 202 as the area copied most frequently by users. The user device may display the window 222 showing a message "This is the area copied most frequently by users". Further, the window 222 may show a menu "View area copied by you". The menu can be used for switching a proposal of the areas copied by users to a proposal of the areas copied by the user themself.

If the user wants to copy the proposed area 212, the user may make a predetermined operation, e.g. one right click by the mouse while clicking the left button or a double tapping by another finger while touching the "er" in the sentence by the finger.

Meanwhile, if the user wants to show another proposal of a copy area, the user may make a further predetermined operation, such as further another left click by a mouse cursor 283 or further another touch by a finger, in the vicinity of the area where the user wants to copy.

In response to a detection of the further predetermined operation, the content, "This version" 213, is highlighted on the screen 203 as the area copied second most frequently by users. The user device may display the window 223 showing a message "This is the area copied most second frequently by users". Further, the window 223 may show a menu "View area copied by you".

If the user wants to copy the proposed area 213, the user may make the predetermined operation, such as one right click by the mouse while clicking the left button, or a double tapping by another finger while touching the "er" in the sentence by the finger.

Meanwhile, if the user wants to show still another proposal of a copy area, the user may make still further predetermined operation, such as still further another left click by a mouse cursor 284 or still further another touch by a finger, in the vicinity of the area where the user wants to copy.

In response to a detection of the still further predetermined operation, the content, "This version could be a document shared among you and your coworkers to allow for," 214, is highlighted on the screen 204 as the area copied third most frequently by users. The user device may display the window 224 showing a message "This is the area copied most third frequently by users". Further, the window 224 may show a menu "View area copied by you".

If the user wants to copy the proposed area 214, the user may make the predetermined operation, such as one right click by the mouse while clicking the left button, or a double tapping by another finger while touching the "er" in the sentence by the finger.

In the embodiment mentioned above, one touch or click is used for proposing a copy area in a predetermined order.

In another embodiment, two or more touches or clicks may be used for proposing a copy area in a predetermined order. Such examples may be as follows: if the user does two touches or clicks, the user device may display the screen 203 in which the area copied most second frequently by users is highlighted. If the user does three touches or clicks, the user device may display the screen 204 in which the area copied most third frequently by users is highlighted. The number of times of touches or clicks may be arbitrarily set as appropriate. If the number of touches or clicks exceeds a predetermined number, the user device may display a list for proposals of copy areas, for example, in a separate window, or the user device may allow a user to select a copy area using a default method provided by an application.

As stated above, when a focus by a user associated a user device is done on a part of contents on a document, a copy area comprising the focused part is proposed in the predetermined order among the proposals of copying content. Accordingly, the user can select a copy area in the predetermined order according to the copying frequency done by a plurality of users.

With reference now to FIG. 2B, FIG. 2B illustrates an embodiment of a screen displaying a copy area which is commonly copied by other users or is copied by a user associated with the user device.

The user device displays a part of a document, for example, a web page or local document, on the screen 231 of the user device.

The screen 232 and the window 252 are the same as the screen 202 and the window 222 described in FIG. 2A, respectively. The screen 232 and the window 252 are displayed according to the same way described above.

If the user wants to show a proposal of a copy area which was copied by the user itself, the user may touch or click the character string, "View area copied by you", in the window 252.

In response to a detection of the touch or click of the character string, the content, "This version could be a document shared among you and your coworkers to allow," 243, is highlighted on the screen 233 as the area copied most frequency by the user itself. The user device may display the window 253 showing a message "This is the area copied most frequently by you". Further, the window 253 may show a menu "View area copied by users".

If the user wants to copy the proposed area 243, the user may make the predetermined operation, such as one right click by the mouse while clicking the left button, or a double tapping by another finger while touching the "er" in the sentence by the finger.

Meanwhile, if the user wants to return to the screen 232, the user may touch or click the character string, "View area copied by users", in the window 253.

In response to a detection of the touch or click of the character string, the user device displays the screen 234 which is the same as the screen 232.

If the user wants to copy the proposed area 244, the user may make the predetermined operation, such as one right click by the mouse while clicking the left button, or a double tapping by another finger while touching the "er" in the sentence by the finger.

In the embodiment mentioned above, a proposal of copy area which is commonly copied by other users is first displayed on the screen. In another embodiment, a proposal of copy area which is copied by a user associated with a user device is first displayed on the screen. The user may select which a proposal of copy area is first displayed on the screen.

As stated above, when a focus by a user associated with a user device is done on a part of contents on a document, a copy area comprising the focused part is proposed in the predetermined order among the proposals of copying content in history information. Further, the user can switch a proposal of the areas from the areas copied by a plurality of users to the areas copied by the user themself or another user, and vice versa. Accordingly, the user can select a copy area in the predetermined order according to the copying frequency done by a plurality of users or the user itself. This selection may be useful when a document may be, for example, but not limited to, a collaborating document, such as a manual or materials on conference, or a web page.

With reference now to FIG. 2C, FIG. 2C illustrates an embodiment of a screen displaying a copy area in a document in which a modification was made compared to an original of a copy source document.

The user device displays a part of a document, for example, a web page or local document, on the screen 261 of the user device.

If the user wants to copy a character string in the document, the user may make a predetermined operation, such as one left click by a mouse cursor 271 or one touch by a finger, in the vicinity of an area where the user wants to copy.

In response to a detection of the one touch or click, the user device obtains information on a cursor or pointer position on the document.

If the position is a character string in the document, such as "er" in the sentence, "This version", the user device obtains a plurality of contents comprising such character string. The plurality of contents is retrieved from a history information which comprises sets of contents in the document and their position information. Let us suppose that a sentence in an original of a copy source document, which sentence corresponding to the copied area recorded in the history information, "This version could be a document shared among you and your coworkers to allow for effective distribution of information," was modified to "To improve data sharing, this version could be a document shared among you and your coworkers to allow for effective distribution of information," prior to displaying of a copy source document which was modified from an original of a copy source document (hereinafter also referred to as "modified copy source document") on the screen. In such a case, the copied area recorded in the history information is updated from "This version could be a document shared among you and your coworkers to allow for effective distribution of information," to "To improve data sharing, this version could be a document shared among you and your coworkers to allow for effective distribution of information," Therefore, the proposal of copying area corresponding to the updated copied area 272 in the history information is presented in replace of the copied area before updated in the history information. Accordingly, the sentence after modification, "To improve data sharing, this version could be a document shared among you and your coworkers to allow for effective distribution of information," is highlighted on the screen 262 as a proposal of the copy area 272. The user device may display the window 273 showing a message "Notes: The original copy source document was modified. The proposal of copying area 272 is presented by taking into account a character string before modification. This area corresponds to the area copied most frequently by users." Further, the window 273 may show a menu "View area copied by you".

As stated above, if a content in the document is modified, a corresponding content in the history information is also similarly modified. Further, if a position of a content in the document is changed, position information on a corresponding content in the history information is updated correspondingly. Therefore, the user device can propose to a user a copy area which is included in a modified copy source document, using the updated history information. Accordingly, a document which will be frequently modified, such as a web page or a collaborating document, is a subject of an embodiment of the present disclosure.

Figure 3A:
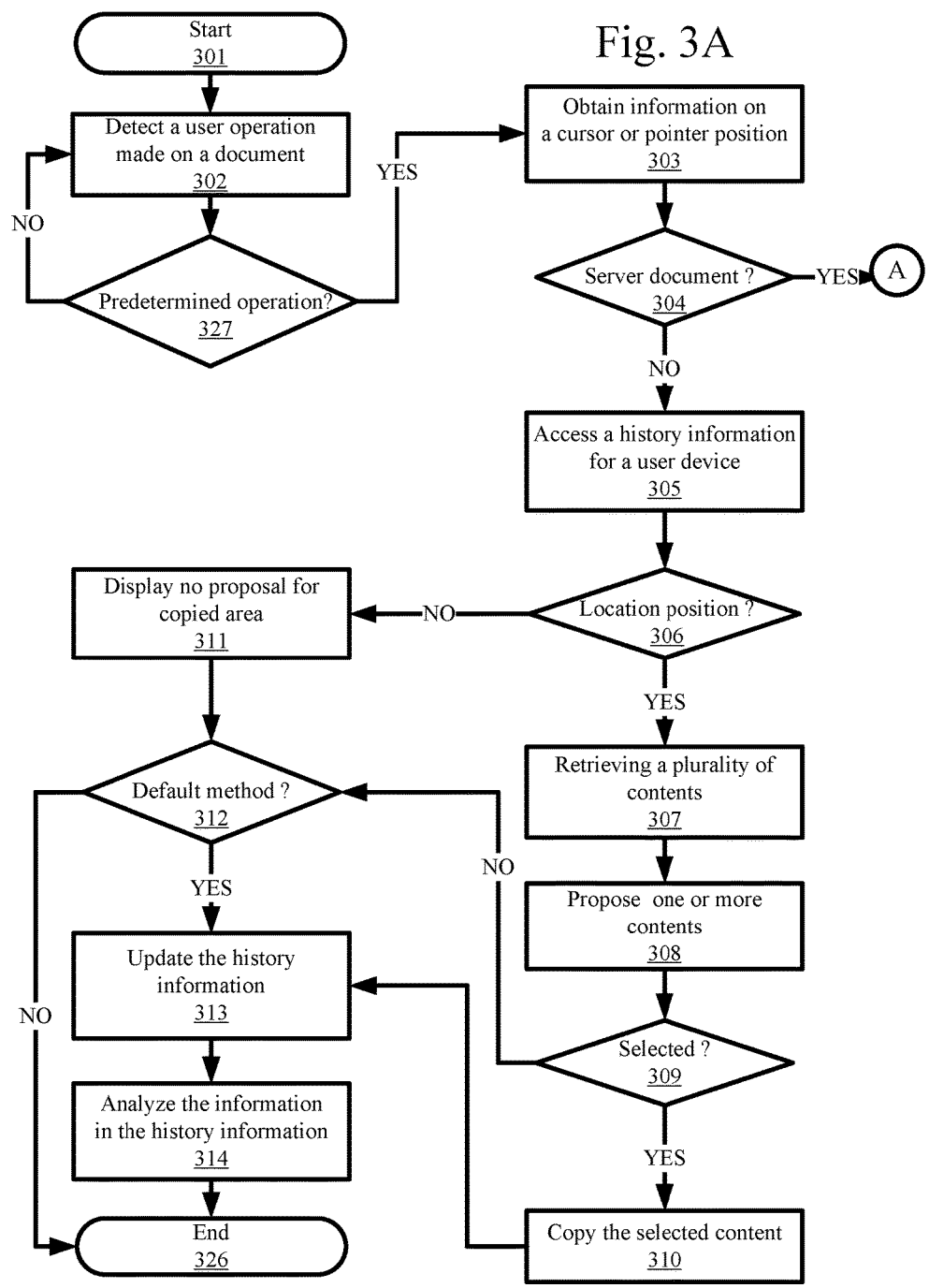
FIGS. 3A and 3B illustrate an embodiment of an overall flowchart of a process for proposing, using a user device, a copy area in a document.
Figure 3B:
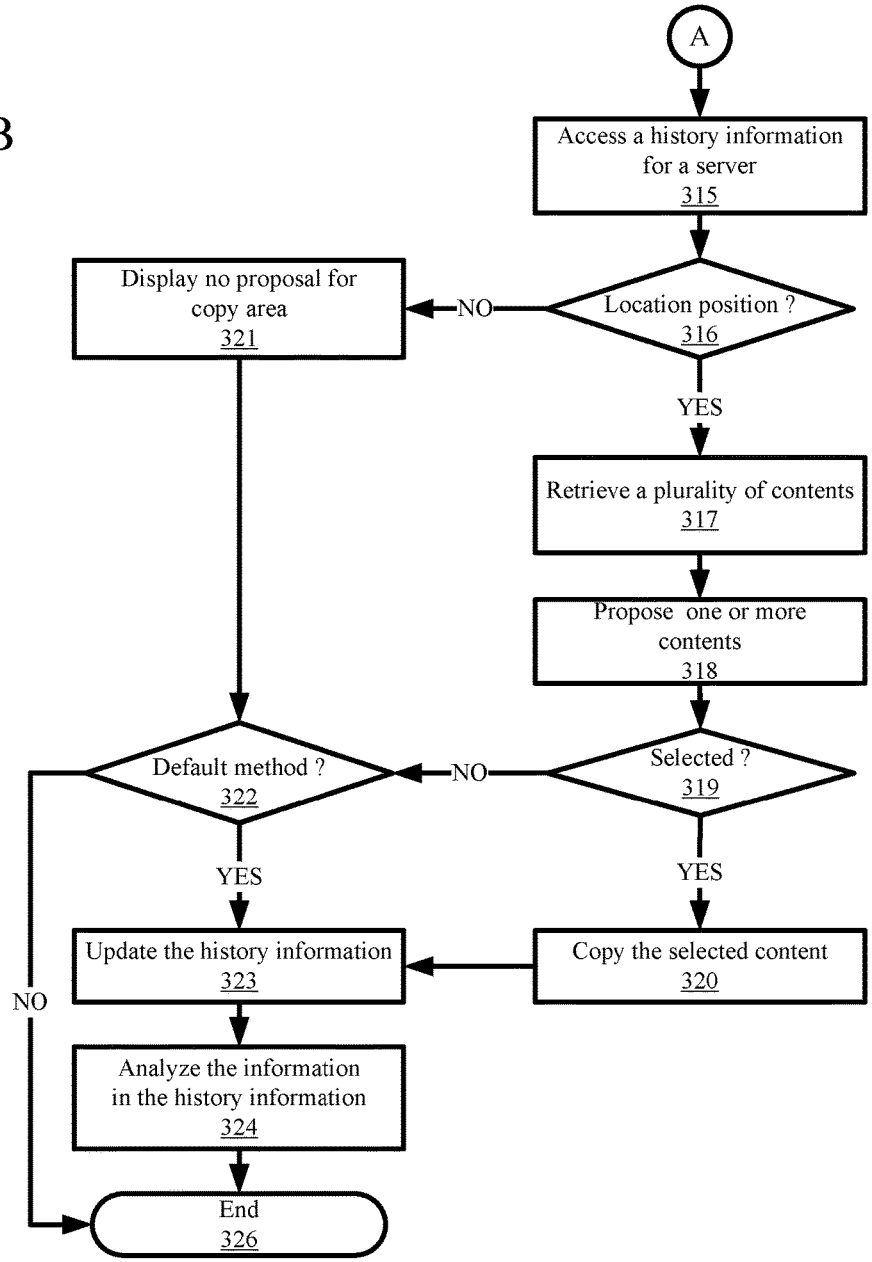

With reference now to FIGS. 3A and 3B, FIGS. 3A and 3B illustrate an embodiment of an overall flowchart of a process for proposing, using a user device, a copy area in a document.

In step 301, the user device starts the process for proposing a copy area in a document.

In step 302, the user device reads, into a memory, a document from a local storage or storage which can be accessible by the user device; or downloads, into the memory, a document from an internet or intranet. Then, the user device displays the document on the screen of the user device. The user device monitors a user operation made on a document. The user operation may be done by, for example, but not limited to, a touch or click made on a content which is displayed on the screen.

In decision 327, the user device may judge whether the user operation is a predetermined operation for starting the proposal of a copy area in the document. If the judgment is positive, the user device may proceed to step 303. Meanwhile, if the judgment is negative, the user device may wait for a next detection.

In step 303, the user device obtains information on a cursor or pointer position on the document in response to a predetermined operation, such as a touch or click by the user. Further, the user device may obtain information on the document. The information may be a storage address of the document, such as a storage path or URL. The information may be used for specifying that the document is stored in the user device, or on the server or network attached storage NAS.

In decision block 304, the user device may judge whether the document is a server document or not. If the judgment is positive, the user device may proceed to step 315 FIG. 3B. Meanwhile, if the judgment is negative, the user device may proceed to step 305.

In step 305, the user device accesses a history information for a user device. The history information for a user device may be stored in a storage of the user device or storage which can be accessible by the user device, such as a server or NAS.

In step 306, the user device judges, using the information on the document, whether the history information for a user device has the location information which was obtained in step 303. If the judgment is positive, the user device may proceed to step 307. Meanwhile, if the judgment is negative, the user device may proceed to step 311.

In step 307, the user device retrieves, from the history information for a user device, a plurality of contents comprising the character string associated with the cursor or pointer position. Each of the retrieved contents has been ranked in a predetermined order.

For example, if the document is a structured document in which tags are used, the retrieval of the plurality of contents comprises calculating an order of tags in the document and the calculated order is used for identifying plurality of contents.

For example, if the document is an unstructured document, the retrieval of the plurality of contents comprises calculating an order of bytes in the document and the calculated bytes are used for identifying plurality of contents.

For example, if the document is a spreadsheet, the retrieval of the plurality of contents comprises calculating cell location in the document and the calculated cell location is used for identifying plurality of contents.

In step 308, the user device proposes one or more contents in the predetermined order among the retrieved plurality of contents. The proposal may be made by displaying the one or more contents on the screen in the predetermined order in response to hover time or user operation. The number of proposed contents may be determined by a predefined operation done by the user. The number of proposed contents may be a plural number. In a case where the retrieved content is only one, only this content can be presented. The user operation may be predefined depending on a user device or an operation system which is running on the user device. The user operation may be, for example, but not limited to, the number of touches or clicks, or, while touching the screen with one finger, the numbertimes that a user touches the screen with another finger. The hover time may be predefined, such as a few seconds.

In decision 309, the user device judges whether the proposed content is selected by the user or not. If the judgment is positive, the user device may proceed to step 310. Meanwhile, if the judgment is negative, the user device may proceed to step 312.

In step 310, the user device copies the selected content to an area specified by the user.

In step 311, the user device may show, for example, a new window on the screen, that there is no proposal of copy area.

In decision 312, the user device judges whether the user selects a copy area using a default method provided by an application. If the judgment is positive, the user device may proceed to step 313. Meanwhile, if the judgment is negative, the user device may proceed to final step 326.

In step 313, the user device updates the history information for a user device using the copied content and its position information. The information to be updated may be, for example, date of copying, information on a copy source document, a copied content, the number of copies made, position of the copied content, a score, a content comprising the copied content, etc.

"Date of copying" may denote a date when a user selected a content in a copy source document and then made a copy operation for the content, or may otherwise provide some measure of the time a copy at which was made.

"Information on a copy source document" may denote a location where the copy source document is stored.

"Copied content" may denote the content to which the copy operation was made.

"The number of copies made" may denote a count that the copy operation was made for each of the same contents in the same position in the copy source document. "The number of copies made" may be for one user who is or is not a user associated with a user device, or a plural users including or not including a user associated with a user device. "The number of copies made" may be calculated for one day or two or more days, or any other measurable time period.

"Position of copied content" may denote a position of the copied document in the copy source document.

"Score" may denote a value associated with each of the contents in the document The score may be calculated from the number of copies made and a weight associated with a date on which the copying of the content in the document was done.

"A content comprising the copied content" may denote a unit of document structure, such as a unit defined by p-tags, which comprises the copied content. "A content comprising the copied content" can be used for verifying a modification of an original source document.

In step 314, the user device may analyze the information in the history information for a user device. An example of merging the information in the history information for a user device will be explained hereinafter by referring to FIG. 7C discussed below.

Referring now to FIG. 3B, in step 315, the user device accesses a history information for a server. The history information for a server may be stored in a server storage or storage which can be accessible by the user device, such as a NAS.

In decision 316, the user device judges, using the information on the document, whether the history information for a server has the location information which may have been obtained in step 303. If the judgment is positive, the user device may proceed to step 317. Meanwhile, if the judgment is negative, the user device may proceed to step 321.

In step 317, the user device retrieves, from the history information for a server, a plurality of contents comprising the character string associated with the cursor or pointer position. Each of the retrieved contents may have been ranked in a predetermined order.

In step 318, the user device proposes one or more contents in the predetermined order among the retrieved plurality of contents. The proposal may be made by displaying the one or more contents on the screen in the predetermined order in response to hover time or user operation. The number of proposed contents may be determined by a predefined operation done by the user. The number of proposed contents may be a plural number. In a case where the retrieved content is only one, only this content can be presented. The user operation may be predefined depending on a user device or an operation system which is running on the user device. The user operation may be, for example, but not limited to, the number of touches or clicks, or, while touching the screen with one finger, the number of times that a user touches the screen with another finger. The hover time may be predefined, such as a few seconds.

In decision 319, the user device judges whether the proposed content is selected by the user or not. If the judgment is positive, the user device may proceed to step 320. Meanwhile, if the judgment is negative, the user device may proceed to decision 322.

In step 320, the user device copies the selected content to an area specified by the user.

In step 321, the user device may show, for example, a new window on the screen, that there is no proposal of copy area.

In decision 322, the user device judges whether the user selects a copy area using a default method provided by an application. If the judgment is positive, the user device may proceed to step 323. Meanwhile, if the judgment is negative, the user device may proceed to final step 326.

In step 323, the user device updates the history information for a server using the copied content and its position information. The information to be updated may be, for example, date of copying, information on a copy source document, a copied content, the number of copies made, position of the copied content, a score, a content comprising the copied content, etc.

In step 324, the user device may analyze the information in the history information for a server. An example of merging the information in the history information for a server will be explained hereinafter by referring to FIG. 7C discussed below.

In step 326, the user device terminates the process mentioned above.

Figure 4A:
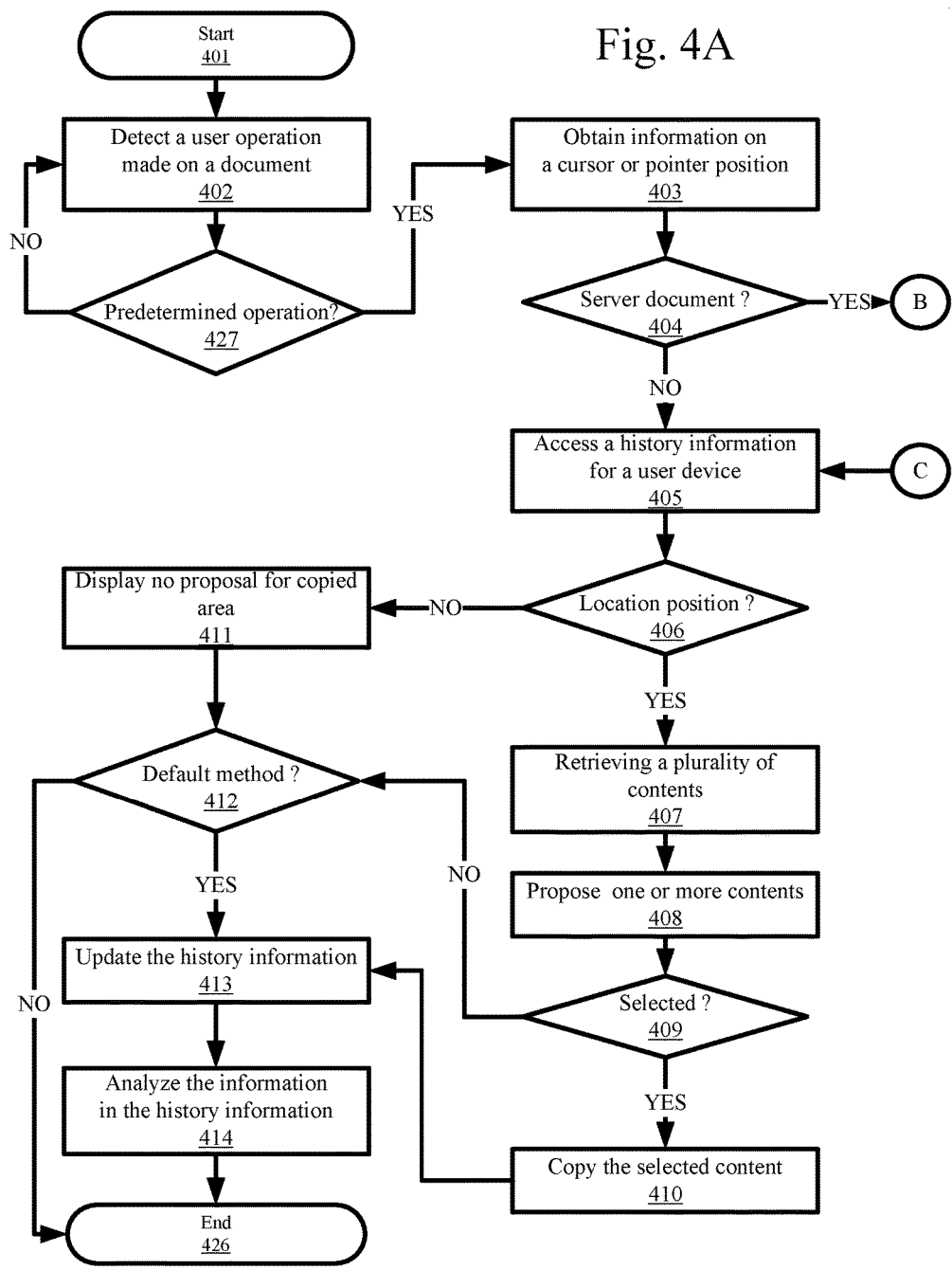
FIGS. 4A and 4B illustrate an embodiment of an overall flowchart of a process for proposing, using a user device and a server, a copy area in a document.
Figure 4B:
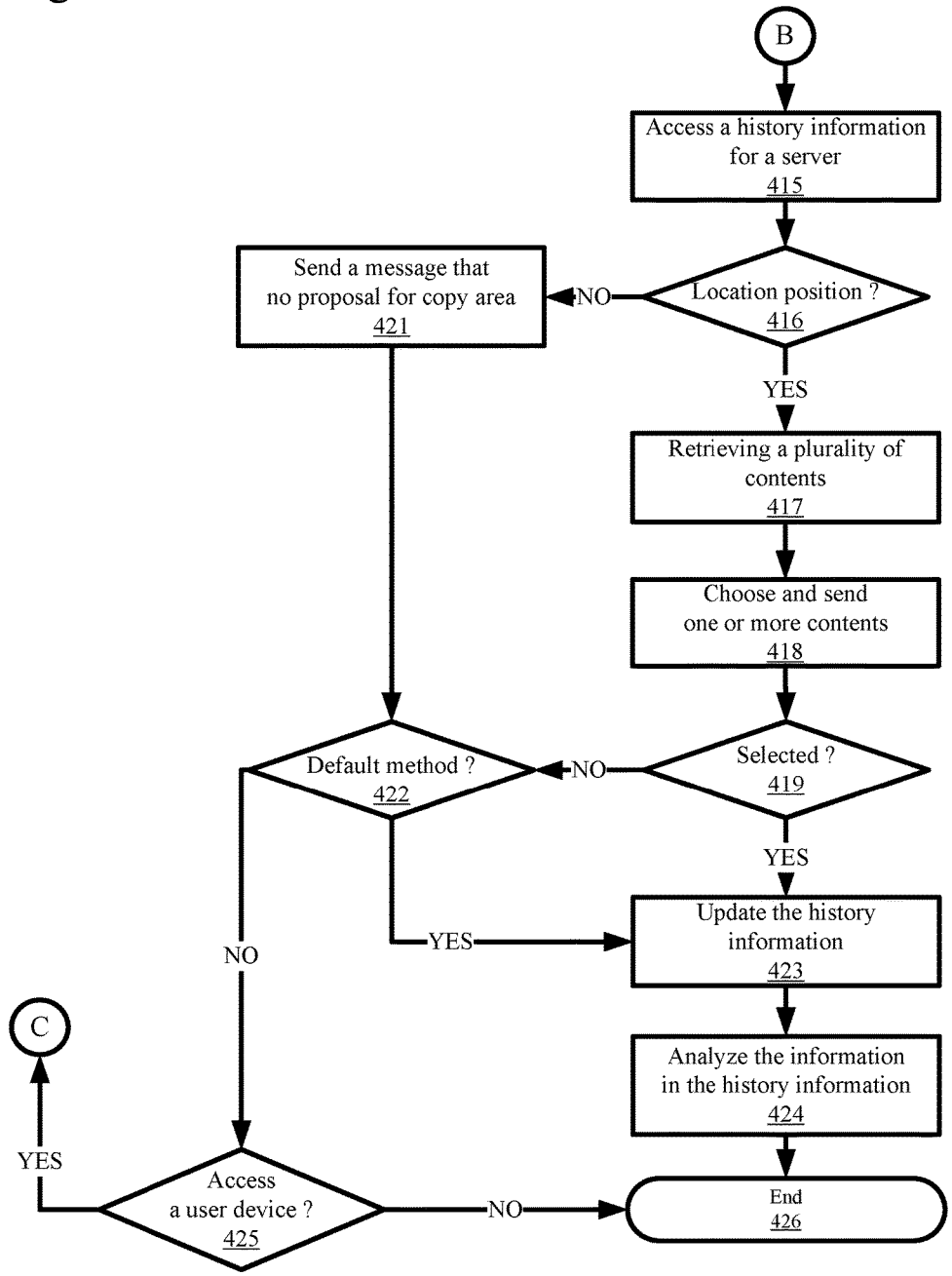

With reference now to FIGS. 4A and 4B, FIGS. 4A and 4B illustrate an example embodiment of an overall flowchart of a process for proposing, using a user device and a server, a copy area in a document.

In step 401, the user device starts the process for proposing a copy area in a document.

In step 402, the user device reads, into a memory, a document from a local storage or storage which can be accessible by the user device; or downloads, into the memory, a document from an internet or intranet. Then, the user device displays the document on the screen of the user device. The user device monitors a user operation made on a document. The user operation may be done by, for example, but not limited to, a touch or click made on a content which is displayed on the screen.

In decision 427, the user device may judge whether the user operation is a predetermined operation for starting the proposal of a copy area in the document. If the judgment is positive, the user device may proceed to step 303. Meanwhile, if the judgment is negative, the user device may wait for a next detection.

In step 403, the user device obtains information on a cursor or pointer position on the document in response to a predetermined operation, such as a touch or click by the user. Further, the user device may obtain information on the document. The information may be a storage address of the document, such as a storage path or URL. The information may be used for specifying that the document is stored in the user device, or on the server or network attached storage NAS.

In step 404, the user device judges whether the document is a server document or not. If the judgment is positive, the user device sends to a server a notification for requesting a retrieval of a plurality of contents comprising the character string associated with the cursor or pointer position and then proceed to step 415 (FIG. 4B). The notification may comprise the information of the document and the cursor or pointer position on the document. The information of the document may be, for example, a storage path or URL. Meanwhile, if the judgment is negative, the user device proceeds to step 405.

In step 405, the user device accesses a history information for a user device. The history information for a user device may be stored in a storage of the user device or storage which can be accessible by the user device, such as a server or NAS.

In decision 406, the user device judges, using the information on the document, whether the history information for a user device has the location information which was obtained in step 403. If the judgment is positive, the user device may proceed to step 407. Meanwhile, if the judgment is negative, the user device may proceed to step 411.

In step 407, the user device retrieves, from the history information for a user device, a plurality of contents comprising the character string associated with the cursor or pointer position. Each of the retrieved contents has been ranked in a predetermined order.

In step 408, the user device proposes one or more contents in the predetermined order among the retrieved plurality of contents. The proposal may be made by displaying the one or more contents on the screen in the predetermined order in response to hover time or user operation. The number of proposed contents may be determined by a predefined operation done by the user. The number of proposed contents may be a plural number. In a case where the retrieved content is only one, only this content can be presented. The user operation may be predefined depending on a user device or an operation system which is running on the user device. The user operation may be, for example, but not limited to, the number of touches or clicks, or, while touching the screen with one finger, the numbertimes that a user touches the screen with another finger. The hover time may be predefined, such as a few seconds.

In decision 409, the user device judges whether the proposed content is selected by the user or not. If the judgment is positive, the user device may proceed to step 410. Meanwhile, if the judgment is negative, the user device may proceed to step 412.

In step 410, the user device copies the selected content to an area specified by the user.

In step 411, the user device may show, for example, a new window on the screen, that there is no proposal of copy area.

In decision 412, the user device judges whether the user selects a copy area using a default method provided by an application. If the judgment is positive, the user device may proceed to step 413. Meanwhile, if the judgment is negative, the user device may proceed to final step 426.

In step 413, the user device updates the history information for a user device using the copied content and its position information. The information to be updated may be, for example, date of copying, information on a copy source document, a copied content, the number of copies made, position of the copied content, a score, a content comprising the copied content, etc.

In step 414, the user device may analyze the information in the history information for a user device. An example of merging the information in the history information for a user device will be explained hereinafter by referring to FIG. 7C discussed below.

Referring now to FIG. 4B, in step 415, the server accesses a history information for a server. The history information for a server may be stored in a storage in the server or storage which can be accessible by the server, such as a NAS.

In decision 416, the server judges, using the information on the document, whether the history information for a server has the location information which was sent from the user device. If the judgment is positive, the server may proceed to step 417. Meanwhile, if the judgment is negative, the server may proceed to step 421.

In step 417, the server retrieves, from the history information for a server, a plurality of contents comprising the character string associated with the cursor or pointer position. Each of the retrieved contents may have been ranked in a predetermined order.

In step 418, the server chooses one or more contents in the predetermined order among the retrieved plurality of contents and then sends them to the user device. In a case where the retrieved content is only one, only this content may be sent. The proposal in the user device may be made by displaying the one or more retrieved contents on the screen in the predetermined order in response to hover time or user operation. The number of proposed contents may be determined by a predefined operation done by the user or administrator of the server.

In decision 419, the server waits for a notification, from the user device, for announcing that the proposed copy area is selected. In response to a receipt of the notification, the server judges whether the proposed content is selected by the user or not. If the judgment is positive, the server may proceed to step 423. Meanwhile, if the judgment is negative, the server may proceed to step 422.

In step 421, the server may send to the user device a message to the effect that there is no proposal of copy area.

In decision 422, the server waits for a notification, from the user device, for announcing that the user selects a copy area using a default method provided by an application. The notification may comprise the information of the document and the cursor or pointer position on the document. The information of the document may be, for example, a storage path or URL. In response to a receipt of the notification, the server judges whether the user selects a copy area using a default method provided by an application. If the judgment is positive, the server may proceed to step 423. Meanwhile, if the judgment is negative, the server may proceed to step 425.

In step 423, the server updates the history information for a server using the copied content and its position information. The information to be updated may be, for example, date of copying, information on a copy source document, copied content, the number of copies made, position of copied content, a score, a content comprising the copied content, etc.

In step 424, the server may analyze the information in the history information for a server. An example of merging the information in the history information for a server will be explained by referring to FIG. 7C discussed below.

In decision 425, the server may judges whether the history information for a user device is used or not. If the judgment is positive, the server may proceed to step 405. Meanwhile, if the judgment is negative, the server may proceed to a final step 426.

In step 426, the user device terminates the process mentioned above.

Figure 5A:
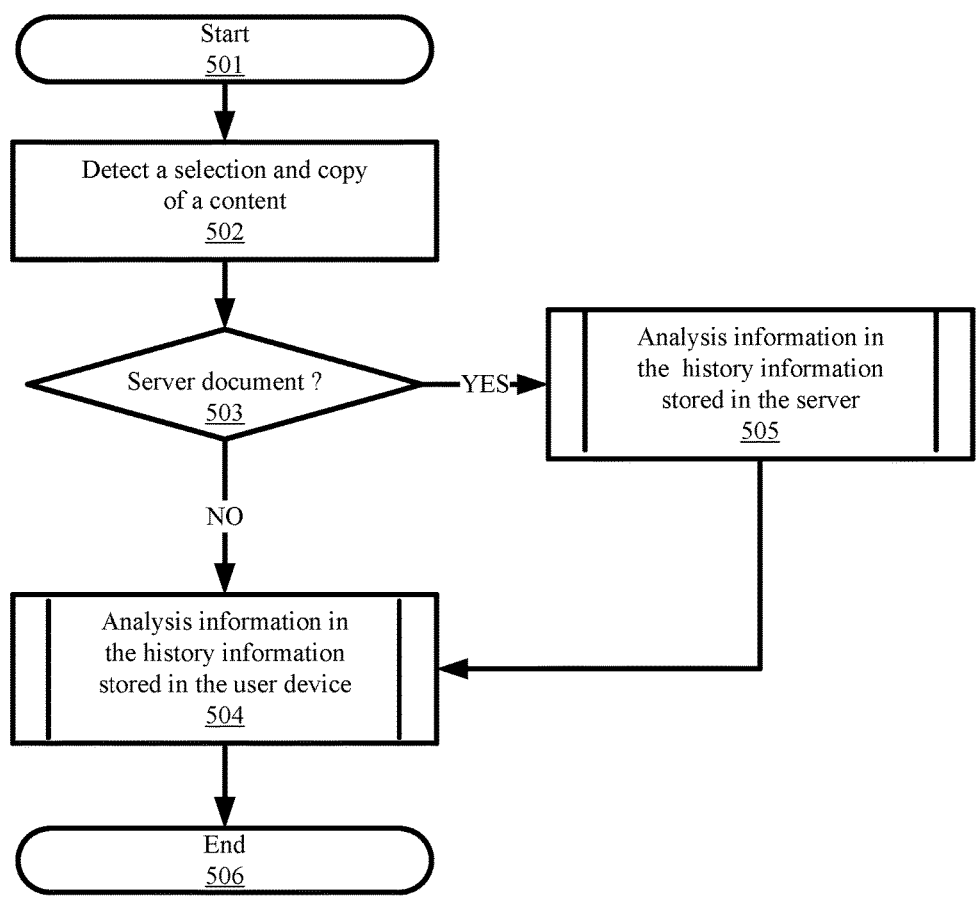
FIGS. 5A and 5B illustrate an embodiment of a flowchart of a process for analyzing, using a history information, information relating to the copied contents.
Figure 5B:
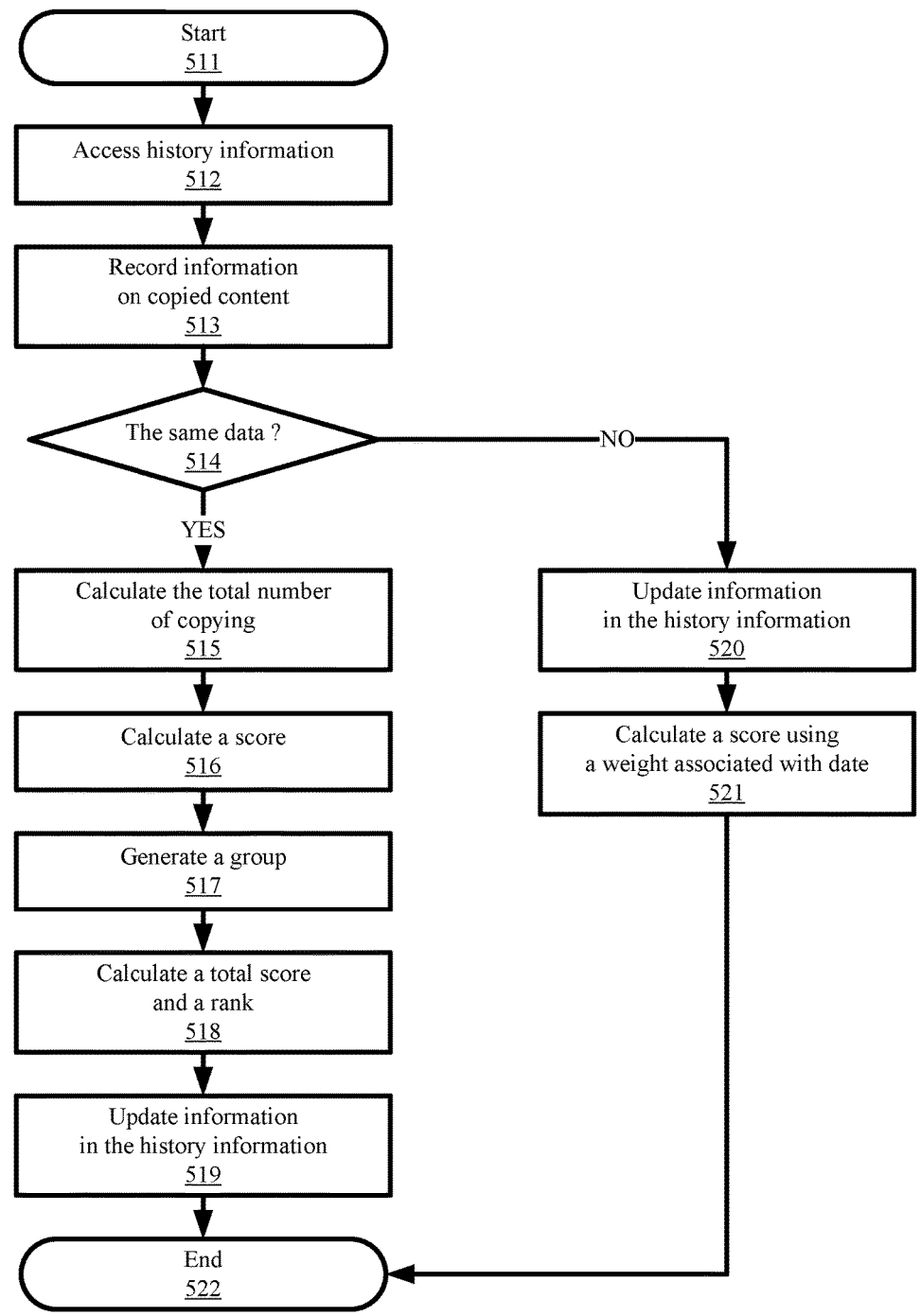

FIGS. 5A and 5B illustrate an embodiment of a flowchart of a process for analyzing, using a history information for a user device or for a server, information relating to the copied contents.

With reference now to FIG. 5A, FIG. 5A illustrates an overall flowchart of the process for analyzing information relating to the copied contents.

In step 501, the user device starts the process for analyzing information relating to the copied contents. In one embodiment, the process can be implemented in step 314 (FIG. 3A), 324 (FIG. 3B), 414 (FIG. 4A), or 424 (FIG. 4B). In another embodiment, the process can be started in a response to a detection of the selection and copy of a content in a document, which detection is described in step 502 below.

In step 502, the user device detects a selection and copy of a content in a document.

In decision 503, the user device judges whether the document is a server document or not. If the judgment is positive, the user device may send to a server a notification for requesting analyzing information in the history information for a server and then the process goes to step 505. Meanwhile, if the judgment is negative, the user device may proceed to step 504.

In step 504, the user device analyzes the information in the history information for a user device. The details of the analysis subprocess will be explained hereinafter by referring to FIG. 5B discussed below.

In step 505, the server analyzes the information in the history information for a server. The details of the analysis subprocess will be explained hereinafter by referring to FIG. 5B discussed below.

In step 506, the server terminates the process mentioned above.

With reference now to FIG. 5B, FIG. 5B illustrates a flowchart of the detail subprocess of step 504, history information stored in the user device, and 505, history information stored in the server.

In the following, a case of step 504, history information stored in the user device, mentioned above is first explained.

In step 511, the user device starts the process for analyzing the information in the history information for a user device.

In step 512, the user device accesses the history information for a user device.

In step 513, the user device records, into the history information for a user device, the information on the content which was copied by the user. The information may comprise, for example, date of copying, information on a copy source document, a copied content, the number of copies made, position of copied content, a content comprising the copied content, etc.

In decision 514, the user device judges whether the history information for a user device already has the same following information or not: information on a copy source document, a copied content, and position of the copied content. All of which are recorded, in step 513, in the history information for a user device. If the judgment is positive, the user device may proceed to step 515. Meanwhile, if the judgment is negative, the server may proceed to step 520.

In step 515, the user device calculates the total copy number for the content which was copied by the user and then records the calculated total number into the history information for a user device to update the total number of copying for the content which was copied by the user.

In step 516, the user device calculates a score associated with each of the contents in the document, using the total number of copying and a weight associated with a date on which the copying of the content in the document was done. The weight may be decided by using a date. In a case where date of copying is new, for example, in a year, high weight is used. Meanwhile, in a case where date of copying is old, for example, before a year, low weight is used. For example, in a case where date of copying is in a year, the weight is one, in a case where date of copying is before a year and in two year, the weight is 0.95, in a case where date of copying is before two year and in three year, the weight is 0.9, and so on. An example of score will be explained hereinafter by referring to FIGS. 7A and 7B discussed below.

In step 517, the user device generates a group in the history information for a user device. The group can be made using information on a copy source document, a copied content and position of the copied content. In each group, the copied contents having the same contents and the same position are summarized. An example of a group will be explained hereinafter by referring to FIG. 7C discussed below.

In step 518, the user device obtains a total score by calculating, in each group, the sum of each score for the same copied contents having the same position of the copied contents. Further, the user device may calculate a rank for each of the same copied content in the group, using the calculated total score and then assigns a number of the ranks to each of the total scores in the group. The ranking may be carried out according to the number of copying, the score or the combination of these. An example of a rank will be explained hereinafter by referring to FIG. 7C discussed below.

In step 519, the user device records, into the history information for a user device, the calculated score, the generated group and the calculated rank to update the history information for a user device.

In step 520, the user device records, into the history information for a user device, information relating to the copied content to update the history information for a user device, since the history information for a user device does not yet record the same data for the copied content.

In step 521, the user device calculates a score associated with the copied content, using the total number of copying and a weight associated with a date on which the copying of the content in the document was done and then record the calculated score into the history information for a user device.

In step 522, the user device terminates the process mentioned above.

In a case of step 504 mentioned above, a subject of steps 511 to 522 may be the user device and a history information is the history information for a user device. In a case of step 505 mentioned above, a subject of steps 511 to 522 may be the server and a history information is the history information for a server. The above explanations of steps 511 to 512 for the user device can be applied also to the case for the server. Therefore, the terms in the above explanations of steps 511 to 512 for the user device, "the user device" and "the history information for a user device", may be read as "the server" and "the history information for a server", respectively.

Figure 6A:
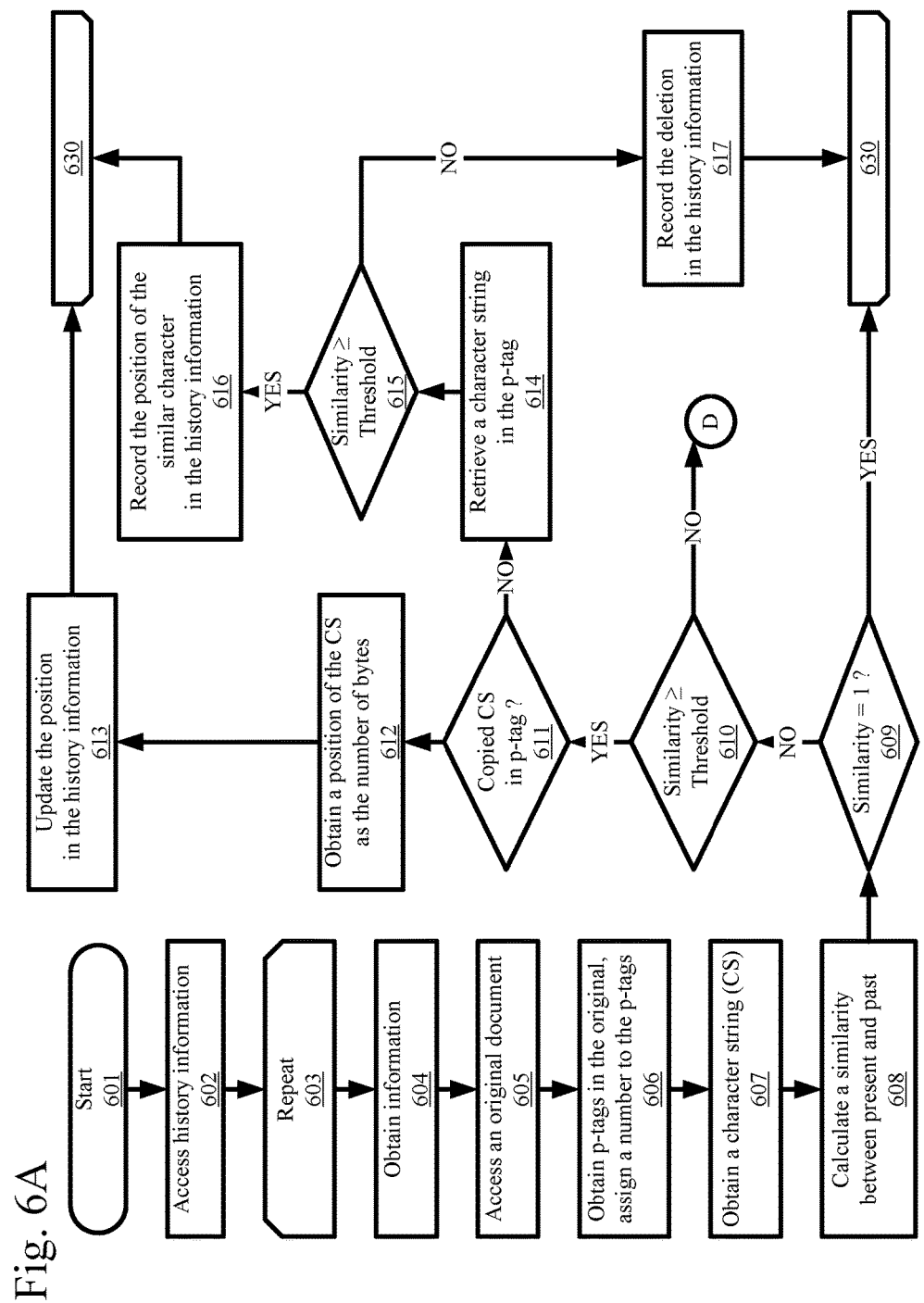
FIGS. 6A and 6B illustrate an embodiment of a flowchart of a process for updating history information in a case where an original of a copy source document having tags is modified.
Figure 6B:
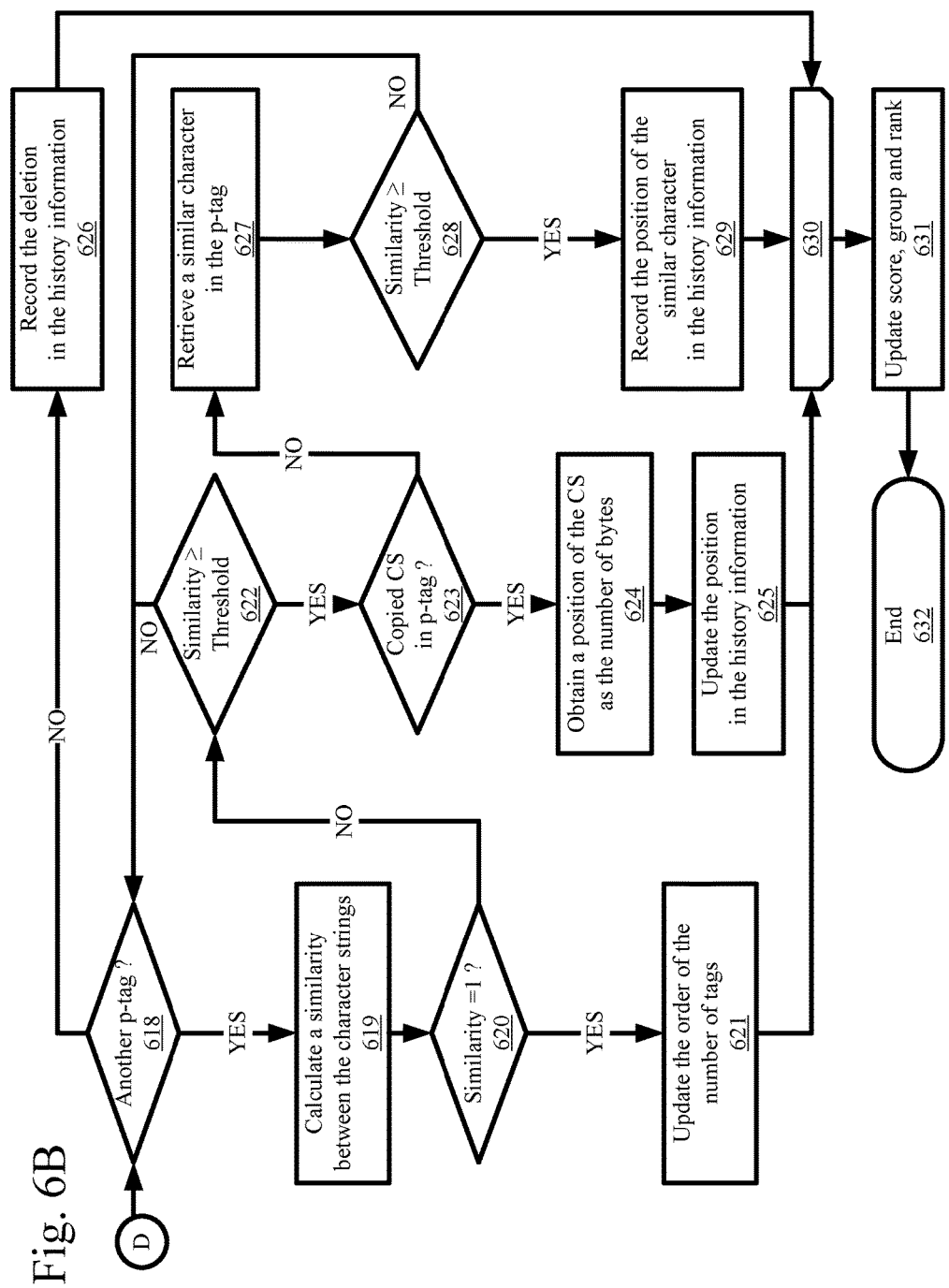

With reference now to FIGS. 6A and 6B, FIGS. 6A and 6B illustrate an embodiment of a flowchart of a process for updating history information for a user device or for a server in a case where an original of a copy source document having tags is modified. One kind of the tags is a p-tag. The p-tag can be represented as:

<P> </P> and is used for defining a paragraph.

In step 601, the user device starts the process for updating history information.

In step 602, the user device accesses a history information for a user device.

In step 603, the user device repeats steps 604 to 630 until unprocessed data exists in the history information for a user device.

In step 604, the user device obtains the following information from the history information for a user device: information on a copy source document, copied character string, position of copied character string, and a character string in p-tag in n-th tag, where n denotes a positive integer.

In step 605, the user device accesses an original of the copy source document.

In step 606, the user device obtains p-tags in the original of the copy source document and then assigns a number to the obtained p-tags. The number may be a positive integer.

In step 607, the user device obtains a character string in the n-th tag.

In step 608, the user device calculates a similarity between the character string in the p-tag which is obtained from the history information for a user device (hereinafter referred to as "the character string in the past time") and the character string in the p-tag which is obtained from the original of the copy source document (hereinafter referred to as "the character string in the present time"). Many known method can be used for calculating such similarity, for example, but not limited to, a cosine similarity.

In decision 609, the user device judges whether the similarity is equal to one or not. If the judgment is positive, the character string in the past time is the same with the character string in the present time and, therefore, the user device proceeds to step 630. Meanwhile, if the judgment is negative, the user device proceeds to decision 610 (FIG. 6B).

In decision 610, the user device judges whether the similarity is larger than or equal to a predetermined threshold or not. If the judgment is positive, the user device proceeds to decision 611. Meanwhile, if the judgment is negative, the user device proceeds to step 618.

In decision 611, the user device judges whether the copied character string is recorded in the character string in the history information which is now recorded or not. If the judgment is positive, the user device proceeds to step 612. Meanwhile, if the judgment is negative, the user device proceeds to step 614.

In step 612, the user device obtains, as the number of bytes, the position of the character string in the p-tag.

In step 613, the user device replaces the position of copied character string in the history information for a user device with the obtained number of bytes to update the history information for a user device.

In step 614, the user device retrieves, from the p-tag, a character string which is similar to the copied character string.

In decision 615, the user device judges whether the similarity between the retrieved similar character string and the character string in the history information which is now recorded is larger than or equal to a predetermined threshold or not. If the judgment is positive, the user device proceeds to step 616. Meanwhile, if the judgment is negative, the user device proceeds to step 617.

In step 616, the user device records, into the history information for a user device, the position of the similar character string which was retrieved in step 614.

In step 617, the user device records, into the history information for a user device, information to the effect that the copied character string was deleted from the original of the copy source document.

Referring now to FIG. 6B, in decision 618, the user device judges whether there is another p-tag in the original of the copy source document. If the judgment is positive, the user device proceeds to step 619. Meanwhile, if the judgment is negative, the user device proceeds to step 626.

In step 619, the user device calculates a similarity between the character string in the p-tags which is obtained from the history information for a user device (hereinafter referred to as "the character string in the past time") and the character string in another p-tag which is obtained from the original of the copy source document (hereinafter referred to as "another character string in the present time").

In decision 620, the user device judges whether the similarity is equal to one or not. If the judgment is positive, the character string in the past time is the same with another character string in the present time and, therefore, the user device proceeds to step 621. Meanwhile, if the judgment is negative, the user device proceeds to decision 622.

In step 621, the user device updates the order of the number of tags in the history information for a user device.

In decision 622, the user device judges whether the similarity is larger than or equal to a predetermined threshold or not. If the judgment is positive, the user device proceeds to decision 623. Meanwhile, if the judgment is negative, the user device proceeds back to decision 618.

In decision 623, the user device judges whether the copied character string is recorded in another character string in the history information which is now recorded or not. If the judgment is positive, the user device proceeds to step 624. Meanwhile, if the judgment is negative, the user device proceeds to step 627.

In step 624, the user device obtains, as the number of bytes, the position of another character string in the p-tag.

In step 625, the user device replaces the position of the copied character string in the history information for a user device with the obtained number of bytes to update the history information for a user device.

In step 626, the user device records, into the history information for a user device, information to the effect that the copied character string was deleted from the original of the copy source document.

In step 627, the user device retrieves, from another p-tag, a character string which is similar to the copied character string.

In decision 628, the user device judges whether the similarity between the retrieved similar character string and the character string in the history information which is now recorded is larger than or equal to a predetermined threshold or not. If the judgment is positive, the user device proceeds to step 629. Meanwhile, if the judgment is negative, the user device proceeds back to decision 618.

In step 629, the user device records, into the history information for a user device, the position of the similar character string which was retrieved in step 627.

In step 630, the user device proceeds back to step 603 to repeat steps 604 to 630 with a new character string.

In step 631, the user device may update a score, a group and/or a rank if the history information for a user device was updated in steps 604 to 630. The update of a score, a group and/or a rank can be made as same way described in steps 516, 517 and 518 (FIG. 5B) mentioned above, respectively.

In step 632, the user device terminates the process mentioned above.

In a case where a subject of steps 601 to 632 may be the user device and a history information may be the history information for a user device is explained above. The above explanations for the user device can be applied also to the case where a subject of steps 601 to 632 may be the server and a history information may be the history information for a server. Therefore, the terms in the above explanations of steps 601 to 632 for the user device, the terms in the above explanations of steps 601 to 632 for the user device, "the user device" and "the history information for a user device" may be read as "the server" and "the history information for a server", respectively.

With reference now to FIG. 7A, FIG. 7A illustrates an example embodiment of a history information for a user device.

The history information for a user device 701 may have any, all, or at least the following information: date of copying, information on a copy source document, a copied content, the number of copies made, position of the copied content, etc. The history information for a user device 701 may further have the following information: score, content comprising the copied content, etc.

The history information for a user device 701 may be prepared using copy histories obtained from a user themself.

Each of the scores described in fifth column of the second, third, fifth and sixth rows in the history information for a user device 701 may be calculated as follows:

(the number of copied made)×(a weight associated with the date of copying)

wherein the weight is one since the date of copying is in a year.

The score described in the fifth column of the fourth row in the history information for a user device 701 may be calculated as follows:

(the number of copies made)×(a weight associated with the date of copying)

wherein the weight is 0.95 since the date of copying is before a year.

In a case where the copy source document is a document written with HTML, the position of the copied content is defined with the order of the number of the tags and the starting and the end bytes in the tag. Examples can be seen in the sixth column of the second and third rows in the history information for a user device 701. For example, {T2; 1st byte; 9th bytes} denotes that the position of the copied content is in the second tag in the copy source document and the copied content is located in $1^{st}$ byte to $9^{th}$ byte in the second tag.

In a case where the copy source document is a document written as a non-structured document, the position of the copied content is defined with the starting and the end bytes in the copy source document. Examples can be seen in the sixth column of the fourth to sixth rows in the history information for a user device 701. For example, {10th byte; 39th byte} denotes that the position of the copied content is located in $10^{th}$ byte to $39^{th}$ byte in the copy source document.

FIG. 7B illustrates an embodiment of a history information for a server.

The history information for a server 711 may have the following information: date of copying, information on a copy source document, a copied content, the number of copies made, position of the copied content, score, content comprising the coped content, etc.

The history information for a server 711 may be prepared using copy histories obtained from a plurality of users. The plurality of users may or may not comprise a user associated with a user device who uses the history information for a server 711.

FIG. 7C illustrates an embodiment of a history information for a server after grouping.

The history information for a server 721 may have the following information: information on a copy source document, group, a copied content, score, position of the copied content, rank, content comprising the copied content, etc.

"Group" can be made using information on a copy source document, a copied content and position of the copied content. One group may be made for each of the copy source document having the common source.

The history information for a server 721 shows the following three groups in the second column: http://www-.sharecopy.com/shareddocs/thisversion*{10th byte; 214th byte}; "Test/NotesDevelopment:Notes: DB*{10th byte; 42nd byte}"; and "Test/NotesDevelopment:Notes: DB*{46th byte; 53rd byte}".

"Total score" may be obtained, for example, by calculating, in each group, the sum of each score for the same copied contents having the same position of the copied contents.

"Rank" may be obtained, for example, by calculating the total score for each score of the same copied content in the group and then assigning a number of the ranks to each of the total scores in the groups.

FIG. 7D illustrates an embodiment of a history information for a user device or server after a modification of a copy source document.

The history information 731 shows an original history information before a modification of a copy source document was made.

In a case where the original of the copy source document is modified, the history information 731 is also modified according to the modification.

For example, if the copied content in the sixth column of the second and third rows, "This version could be a document shared among you and your coworkers to allow for effective distribution of information. If a single source document is used to supply multiple projects, shared copying may be especially useful," is modified to "To improve data sharing, this version could be a document shared among you and your coworkers to allow for effective distribution of information. If a single source document is used to supply multiple projects, shared copying may be especially useful," the history information 731 is updated by replacing the copied content with the modified sentence to generate the updated history information 741. Further, the position information on the modified content and the content relating to the modified content in the history information 731 is also updated accordingly, as seen in the sixth column of the second and third rows of the updated history information 741.

For example, if the copied content, "Welcome to this doc!" which can be seen in the third column of the fourth row in the history information 731, is deleted from the original of the copy source document, the history information 731 is updated to show the effect that the copied content is deleted. Accordingly, the updated history information 741 shows that "copied content" and "the number of copies made" are "{deleted}" in the third column of the fourth row.

After the updated history information 741 is generated, the updated history information 741 is used for proposing a copy area in a document in replace of the history information 731.

In a case where the history information for a user device is associated with the history information for a server and the history information for a user device is updated, the history information for a server is also similarly modified according to the update done in the history information for a user device.

With reference now to FIG. 7E, FIG. 7E illustrates an embodiment of an availability information on a document.

The availability information 751 may define a rule for determining where the copied character string is stored or uploaded and who can access the history information.

The availability information 751 has the following information: information on a copy source document, document where the copied content is pasted, place where information is available, security information, etc.

"Information on a copy source document" may denote a location where the copy source document is stored.

"Place where information is available" may denote a range where the history information for a server or user device is available.

"Security information" may denote whether the history information for a server can be shared with a server or user device. For example, a user associated with a user device can determine that a copy history made by the user itself is or is not shared with a server.

The availability information 751 may be used to determine in which history information the copied character string is stored, that is, a history information for a user device or a history information for a server. The determination can be made according to the "Place where information is available".

In a case where a server document is downloaded to a user device and then a character string in the server document is copied, the copied character string is uploaded to the server from the user device.

Further, the availability information 751 may be used for determining a sharing range of the history information. The determination can be made according to the "Security information".

Figure 8:
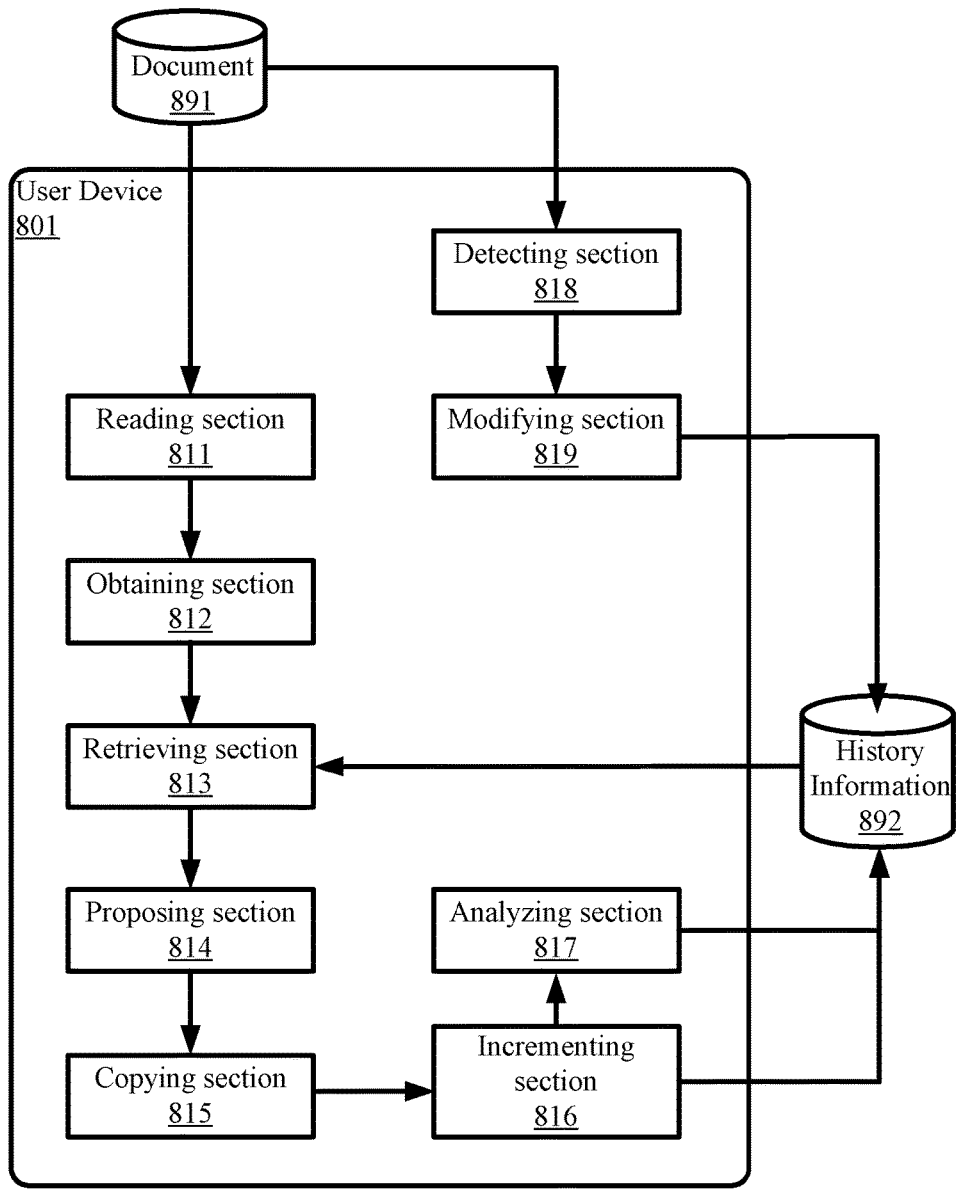
FIG. 8 illustrates of an overall functional block diagram of a user device which is used in accordance with the embodiment of the overall flowchart described in FIGS. 3A and 3B.

With reference now to FIG. 8, FIG. 8 illustrates of an overall functional block diagram of an example of a user device which is used in accordance with the embodiment of the overall flowchart described in FIGS. 3A and 3B.

The user device 801 may correspond to the computer 101 described in FIG. 1.

The user device 801 may comprise a reading section 811, an obtaining section 812, a retrieving section 813, a proposing section 814, a copying section 815, an incrementing section 816 and an analyzing section 817. The user device 801 may further comprise a detecting section 818 and a modifying section 819.

The reading section 811 may read, into a memory, a document from a local storage or storage 891 which can be accessible by the user device 801; or downloads, into the memory, a document from an internet or intranet.

The obtaining section 812 may detect the user operation and, if the user operation is a predetermined operation for starting the proposal of a copy area in the document, then obtain information on a cursor or pointer position on a document displayed on a screen. The obtaining section 812 may perform a part of step 302, and step 303 described in FIG. 3A.

The retrieving section 813 may retrieve, from a history information 892, a plurality of second contents if the position is on a first content in the document. Each of the second contents comprises the first content. The retrieving section 813 may perform steps 304 to 307 described in FIG. 3A and 315 to 317 described in FIG. 3B.

The proposing section 814 may propose, as a copy area, one or more second contents in the predetermined order among the retrieved second contents. The proposing section 814 may display the one or more second contents on the screen in the predetermined order in response to hover time or user operation. The proposing section 814 may perform step 308 described in FIG. 3A and step 318 described in FIG. 3B.

The copying section 815 may copy the content selected by a user to an area designated by a user. The copying section 815 may perform steps 309 and 310 described in FIG. 3A and steps 319 and 320 described in FIG. 3B.

The incrementing section 816 may increment the number of copying of a corresponding content in the history information 892, if the proposed copy area is selected and then copied by a user. The incrementing section 816 may perform step 313 described in FIG. 3A and step 323 described in FIG. 3B.

The analyzing section 817 may analyze the information in the history information 892. The analyzing section 817 may perform step 314 described in FIG. 3A and step 324 described in FIG. 3B and all steps described in FIG. 5B.

The detecting section 818 may detect that an original document is modified.

The modifying section 819 may modify the history information 892 if a content in the document is modified. If a content in the document is modified, the modifying section 819 may also similarly modify a corresponding content in the history information. If a position of a content in the document is changed, the modifying section 819 may correspondingly change position information on a corresponding content in the history information.

Figure 9:
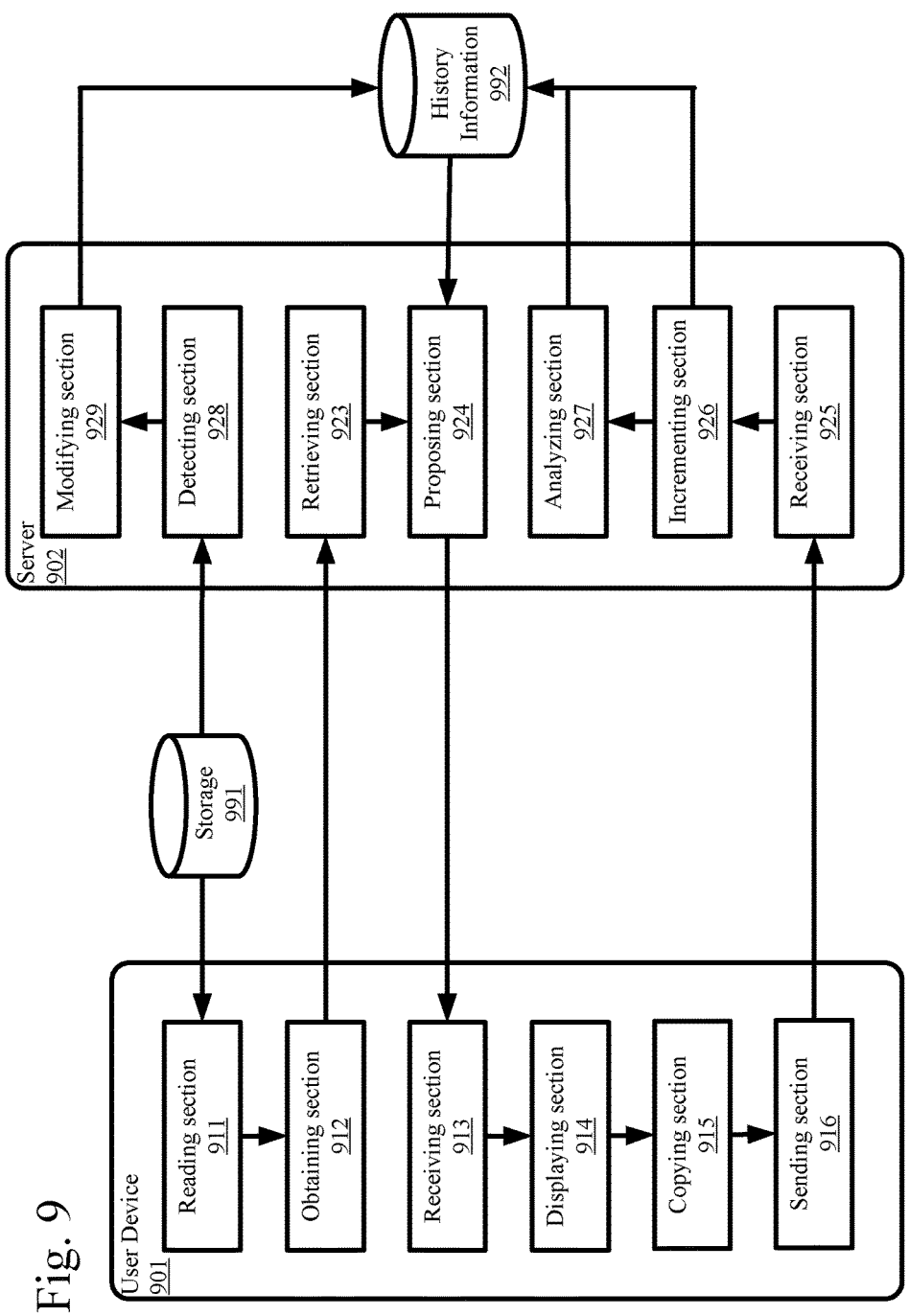
FIG. 9 illustrates of an overall functional block diagram of a computer system hardware comprising a user device and a server which are used in accordance with the embodiment of the overall flowchart described in FIGS. 4A and 4B.

With reference now to FIG. 9, FIG. 9 illustrates of an overall functional block diagram of a computer system hardware comprising a user device and a server which may be used in accordance with the example embodiment of the overall flowchart described in FIGS. 4A and 4B.

The user device 901 may correspond to the computer 101 described in FIG. 1.

The user device 901 may comprise a reading section 911, an obtaining section 912, a receiving section 913, a displaying section 914, a copying section 915 and a sending section 916.

The reading section 911 may read, into a memory, a document from a local storage or storage 991 which can be accessible by the user device 901; or downloads, into the memory, a document from an internet or intranet.

The obtaining section 912 may detect the user operation and, if the user operation is a predetermined operation for starting the proposal of a copy area in the document, then obtain information on a cursor or pointer position on a document displayed on a screen. The obtaining section 912 may send the information on a cursor or pointer position to the server 902. The obtaining section 912 may perform a part of step 402, and steps 403 to 404 described in FIG. 4A.

The receiving section 913 may receive, from the server 902, one or more second contents comprising the first content associated with the cursor or pointer position. The received one or more contents may be in the predetermined order.

The displaying section 914 may display, as a copy area, the one or more contents comprising the content associated with the cursor or pointer position.

The copying section 915 may copy the content selected by a user to an area designated by a user.

The sending section 916 may send information on the copied content to the server 902.

The server 902 may comprise a retrieving section 923, a proposing section 924, a receiving section 925, an incrementing section 926 and an analyzing section 927. The server 902 may further comprise a detecting section 928 and a modifying section 929.

The retrieving section 923 may retrieve, from a history information 992, a plurality of second contents if the position is on a first content in the document. Each of the second contents comprises the first content. The retrieving section 923 may perform steps 415 to 417 described in FIG. 4B.

The proposing section 924 may propose, as a copy area, one or more second contents in the predetermined order among the retrieved second contents. The proposing section 924 may send one or more second contents to the user device 901.

The receiving section 925 may receive the information on the copied content from the user device 901.

The incrementing section 926 may increment the number of copying of a corresponding content in the history information 992, if the server 902 receives the information on the copied content from the user device 901. The incrementing section 926 may perform step 423 described in FIG. 4B.

The analyzing section 927 may analyze the information in the history information 992. The analyzing section 927 may perform step 424 described in FIG. 4B and all steps described in FIG. 5B.

The detecting section 928 may detect that an original document is modified.

The modifying section 929 may modify the history information 992 if a content in the document is modified. If a content in the document is modified, the modifying section 929 may also similarly modify a corresponding content in the history information. If a position of a content in the document is changed, the modifying section 929 may correspondingly change position information on a corresponding content in the history information.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for proposing a copy area in a document, the method comprising:
   obtaining information on a pointer position on a first content on a document displayed on a screen;
   retrieving, from a history information, a plurality of second contents, each of the second contents comprising the first content, wherein the history information comprises sets of contents, each set of the sets of contents comprising a content in the document which was copied by one or more users, and position information of the content, and a score associated with each content of the sets of contents, the score calculated according to:
   a copying number, wherein the copying number is a number of times a content from the sets of contents was copied wherein when a proposed copy area is selected by a user, the copying number of a corresponding content in the history information is incremented, and
   a weight associated with a date on which the content from the set of contents was copied the sets ranked in a predetermined order according to the copying number and the score; and
   proposing, as a copy area, one or more second contents in the predetermined order among the retrieved second contents.

2. The method according to claim 1, wherein the proposal is made by displaying the one or more second contents on the screen in the predetermined order in response to user operation.

3. The method according to claim 1, wherein when a content in the document is modified, a corresponding content in the history information is also similarly modified.

4. The method according to claim 1, wherein when a position of a content in the document is changed, position information on a corresponding content in the history information is updated correspondingly.

5. The method according to claim 1, wherein the history information further comprises:
   the number of times copied for each of the contents in the document; and
   the ranking is carried out according to the number of times copied.

6. The method according to claim 5, wherein the copying is done by one user.

7. The method according to claim 5, wherein the copying is done by multiple users.

8. The method of claim 1, wherein a user device carries out obtaining the information, retrieving the plurality of second contents and proposing the one or more second contents.

9. The method of claim 8, wherein the history information is stored in the user device.

10. The method of claim 8, wherein the history information is stored in a server.

11. The method of claim 8, wherein the history information is stored in a network attached storage connected to the user device.

12. The method according to claim 1, wherein the first content is selected from the group consisting of a character string, a cell, a photo image, and a moving image.

13. The method according to claim 1, wherein the document is a structured document in which tags are used, and wherein the retrieval of the plurality of second contents comprises calculating an order of tags in the document and the calculated order is used for identifying plurality of second contents.

14. The method according to claim 1, wherein the document is an unstructured document and wherein the retrieval of the plurality of second contents comprises calculating an order of bytes in the document and the calculated bytes are used for identifying plurality of second contents.

15. The method according to claim 1, wherein the document is a spreadsheet and wherein the retrieval of the plurality of second contents comprises calculating cell location in the document and the calculated cell location is used for identifying plurality of second contents.

16. A computer system for proposing a copy area in a document, the computer system comprising:
   a memory; and
   a processor in communication with the memory, wherein the computer system is configured to perform a method, the method comprising:
      obtaining information on a pointer position on a first content on a document displayed on a screen;
      retrieving, from a history information, a plurality of second contents, each of the second contents comprising the first content, wherein the history information comprises sets of contents, each set of the sets of contents comprising a content in the document which was copied by one or more users, and position information of the content, and a score associated with each content of the sets of contents, the score calculated according to:
         a copying number, wherein the copying number is a number of times a content from the sets of contents was copied wherein when a proposed copy area is selected by a user, the copying number of a corresponding content in the history information is incremented, and a weight associated with a date on which the content from the set of contents was copied the sets ranked in a predetermined order according to the copying number and the score; and proposing, as a copy area, one or more second contents in the predetermined order among the retrieved second contents.

17. A computer program product for proposing a copy area in a document, the computer program product comprising a computer readable storage medium having program instructions embodied therewith, wherein the computer readable storage medium is not a transitory signal per se, the program instructions executable by a processor to perform a method comprising:

obtaining information on a pointer position on a first content on a document displayed on a screen;

retrieving, from a history information, a plurality of second contents, each of the second contents comprising the first content, wherein the history information comprises sets of contents, each set of the sets of contents comprising a content in the document which was copied by one or more users, and position information of the content, and a score associated with each content of the sets of contents, the score calculated according to:

a copying number, wherein the copying number is a number of times a content from the sets of contents was copied wherein when a proposed copy area is selected by a user, the copying number of a corresponding content in the history information is incremented, and a weight associated with a date on which the content from the set of contents was copied the sets ranked in a predetermined order according to the copying number and the score; and proposing, as a copy area, one or more second contents in the predetermined order among the retrieved second contents.

* * * * *